US009833102B2

(12) United States Patent
Peterson et al.

(10) Patent No.: US 9,833,102 B2
(45) Date of Patent: Dec. 5, 2017

(54) BEVERAGE FORMATION APPARATUS AND METHOD USING VIBRATORY ENERGY

(75) Inventors: Peter Peterson, Waterbury, VT (US); Ross Peter Jones, Cambridge (GB); Miles William Noel Hember, Cambridge (GB); Javier Gonzalez-Zugasti, North Billerica, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 459 days.

(21) Appl. No.: 13/523,961

(22) Filed: Jun. 15, 2012

(65) Prior Publication Data

US 2012/0308688 A1 Dec. 6, 2012

Related U.S. Application Data

(63) Continuation-in-part of application No. 12/971,535, filed on Dec. 17, 2010, now Pat. No. 9,204,751.
(Continued)

(51) Int. Cl.
*A47J 31/44* (2006.01)
*A47J 31/00* (2006.01)
(Continued)

(52) U.S. Cl.
CPC ......... *A47J 31/002* (2013.01); *A47J 31/3623* (2013.01); *A47J 31/44* (2013.01);
(Continued)

(58) Field of Classification Search
CPC ...... A47J 31/002; A47J 31/44; A47J 31/3623; A47J 31/3631; B65D 85/8043;
(Continued)

(56) References Cited

U.S. PATENT DOCUMENTS 4,581,239 A 4/1986 Woolman et al.
4,779,520 A 10/1988 Hauslein
(Continued)

FOREIGN PATENT DOCUMENTS

DE 2111996 A1 9/1972
DE 29713279 U1 * 3/1998
(Continued)

OTHER PUBLICATIONS

International Search Report and Written Opinion of the International Searching Authority in corresponding Application No. PCT/US2012/042586, dated Sep. 28, 2012.
(Continued)

*Primary Examiner* — Jyoti Chawla
(74) *Attorney, Agent, or Firm* — Wolf, Greenfield & Sacks, P.C.

(57) ABSTRACT

Apparatus and method for forming beverages using a beverage cartridge and sonic energy. A cartridge may include a sonic receiver, such as a feature that extends into an interior space of the cartridge and is arranged to receive a sonic emitter that introduces sonic energy into the interior space. The sonic receiver may be excited by sonic energy, which causes the sonic receiver to itself introduce sonic energy into the cartridge.

15 Claims, 11 Drawing Sheets

Related U.S. Application Data

(60) Provisional application No. 61/284,477, filed on Dec. 18, 2009, provisional application No. 61/335,083, filed on Dec. 31, 2009, provisional application No. 61/497,287, filed on Jun. 15, 2011, provisional application No. 61/500,241, filed on Jun. 23, 2011.

(51) Int. Cl.

| | |
|---|---|
| *A47J 31/36* | (2006.01) |
| *B65D 85/804* | (2006.01) |
| *B01F 11/00* | (2006.01) |
| *B01F 11/02* | (2006.01) |
| *B01F 13/00* | (2006.01) |
| *B01F 13/08* | (2006.01) |
| *B01F 15/00* | (2006.01) |
| *B01F 3/12* | (2006.01) |

(52) U.S. Cl.
CPC ........ *B01F 3/1242* (2013.01); *B01F 11/0002* (2013.01); *B01F 11/0005* (2013.01); *B01F 11/0022* (2013.01); *B01F 11/0042* (2013.01); *B01F 11/0068* (2013.01); *B01F 11/0258* (2013.01); *B01F 11/0266* (2013.01); *B01F 13/0052* (2013.01); *B01F 13/0818* (2013.01); *B01F 15/00318* (2013.01); *B01F 15/00896* (2013.01); *B65D 85/8043* (2013.01); *B01F 2215/0454* (2013.01)

(58) Field of Classification Search
CPC ............. B01F 11/0258; B01F 11/0266; B01F 13/0052; B01F 13/0818
USPC ............... 426/89, 90, 234, 433; 99/295, 298
See application file for complete search history.

(56) References Cited

U.S. PATENT DOCUMENTS

| | | | |
|---|---|---|---|
| 4,983,412 A | | 1/1991 | Hauslein |
| 4,984,511 A | * | 1/1991 | Sekiguchi ................ 99/287 |
| 5,840,189 A | * | 11/1998 | Sylvan ............... B65D 85/8043 210/233 |
| 2002/0148357 A1 | | 10/2002 | Lazaris et al. |
| 2005/0266122 A1 | | 12/2005 | Franceschi |
| 2008/0032030 A1 | * | 2/2008 | Babaev ................ A23F 5/26 426/594 |
| 2009/0004351 A1 | * | 1/2009 | Maurer ............... A47J 31/0631 426/433 |
| 2010/0068354 A1 | | 3/2010 | Roberson et al. |
| 2010/0288131 A1 | * | 11/2010 | Kilber et al. ................... 99/295 |

FOREIGN PATENT DOCUMENTS

| | | | |
|---|---|---|---|
| GB | 2268392 A | | 1/1994 |
| GB | 2447579 A | * | 9/2008 |
| JP | H8-281020 A | | 10/1996 |
| JP | 2002-238766 A | | 8/2002 |
| WO | WO 02/19875 A1 | | 3/2002 |
| WO | WO 2004/071899 A1 | | 8/2004 |
| WO | WO 2009/084059 A1 | | 7/2009 |
| WO | WO 2010/028282 A1 | | 3/2010 |

OTHER PUBLICATIONS

International Search Report and Written Opinion for International Application No. PCT/US2010/061002 dated Feb. 28, 2011.

* cited by examiner

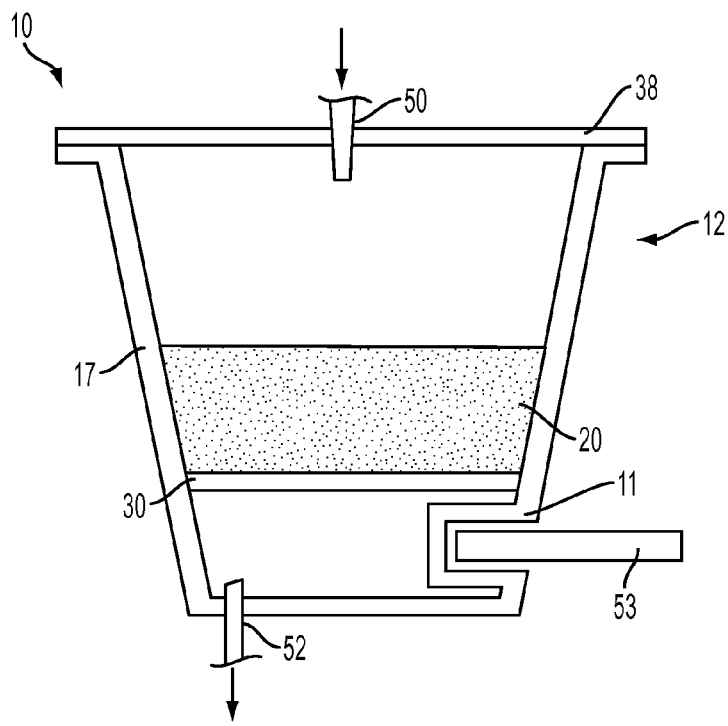
FIG. 4
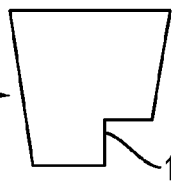 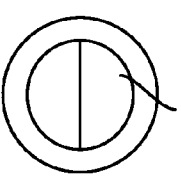 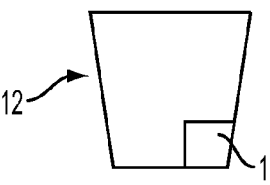 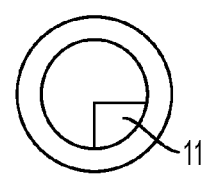
FIG. 5  FIG. 6  FIG. 7  FIG. 8
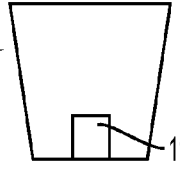 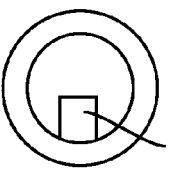 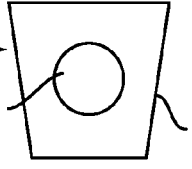 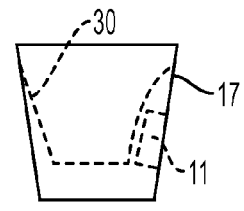
FIG. 9  FIG. 10  FIG. 11  FIG. 12
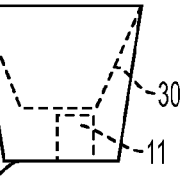 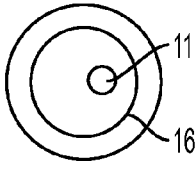 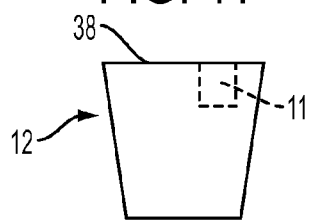 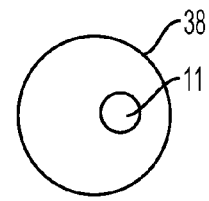
FIG. 13  FIG. 14  FIG. 15  FIG. 16

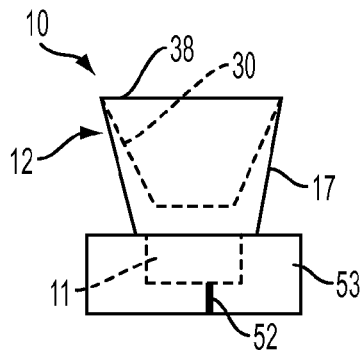
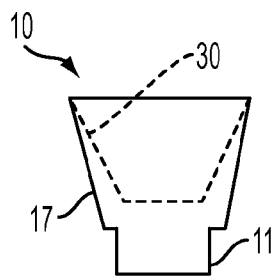
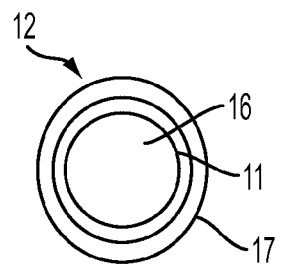
FIG. 17         FIG. 18         FIG. 19
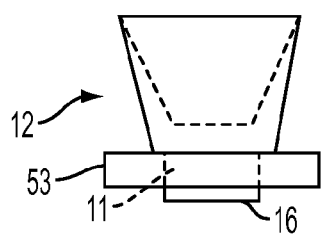
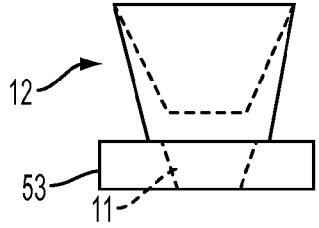
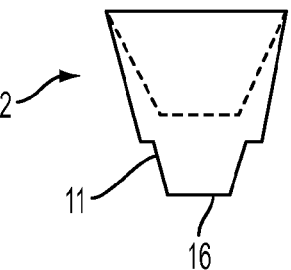
FIG. 20         FIG. 21         FIG. 22
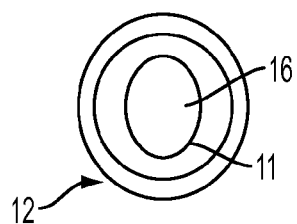
FIG. 23

BEVERAGE FORMATION APPARATUS AND METHOD USING VIBRATORY ENERGY

This application is a continuation in part of U.S. application Ser. No. 12/971,535, filed Dec. 17, 2010, now U.S. Pat. No. 9,204,751 which claims the benefit of U.S. Provisional applications 61/284,477, filed Dec. 18, 2009 and 61/335,083, filed Dec. 31, 2009. This application claims the benefit of U.S. Application 61/497,287, filed Jun. 15, 2011 and U.S. Application 61/500,241, filed Jun. 23, 2011, which are hereby incorporated by reference in their entirety.

BACKGROUND

Various patents describe the use of sonic energy when brewing coffee, including U.S. Pat. No. 4,779,520, U.S. Pat. No. 4,983,412, and U.S. Patent Publication 20080032030 which describe applying ultrasonic energy to the exterior of a drip-brewing funnel and/or directly to the coffee grounds and water at the interior of the funnel. However, applying ultrasonic energy to the exterior of a brew funnel will not necessarily allow for suitable control of the sonic energy at the interior of the brew funnel, e.g., resulting in some areas receiving energy of a different intensity and/or frequency than other areas. Also, applying sonic energy to the interior of a brew funnel may in some cases to cause erosion of an ultrasonic probe having a metal exterior, resulting in the possibility that eroded material is deposited in the coffee grounds or other beverage medium.

SUMMARY OF INVENTION

Aspects of the invention relate to applying vibratory or other sonic energy to the interior of a beverage cartridge that contains a beverage medium and a liquid introduced into the cartridge interior. The cartridge may be arranged to have a sonic receiver that receives sonic energy for introduction into the interior space of the cartridge. For example, the sonic receiver may include an acoustically compliant portion of the cartridge that vibrates or otherwise moves in response to the sonic energy so as to itself transmit sonic energy to the cartridge interior. In another arrangement, the sonic receiver may include a motion creating structure that is arranged to cause beverage medium and/or liquid in the cartridge to move in response to vibratory motion of the motion creating structure caused by a sonic emitter or other oscillating drive system. In some other embodiments, the sonic receiver may include an acoustically transparent portion, an acoustic coupling medium, a depression or other feature to interact with a sonic emitter, or other feature to allow the sonic emitter to transmit sonic energy directly into the cartridge. The sonic receiver may be arranged to direct sonic energy to particular areas of the interior space of the cartridge, focus, disperse or otherwise modify the sonic energy to make the intensity of the sonic energy more uniform in at least parts of the interior space, and/or have other affects on the sonic energy. This may help avoid problems associated with having sonic energy concentrated in one or more areas, such as tunneling where the sonic energy effectively forms a pathway in a beverage medium through which liquid may "short circuit" or pass through the cartridge without sufficiently contacting the beverage medium. Tunneling can cause a resulting beverage to be weak because of the insufficient contact of liquid with the beverage medium.

In one aspect of the invention, a beverage cartridge arranged for use in a beverage forming machine to make a beverage may include a container having a closed interior space and a beverage medium located in the interior space. The beverage medium may be used to form a beverage by interaction of the beverage medium with a liquid introduced into the interior space and may include, for example, roast and ground coffee, sweeteners, creamers, instant drink mixes, and other soluble and/or insoluble materials. A motion creating structure may also be included in the closed interior space of the container and arranged to cause movement of the beverage medium or liquid in the cartridge relative to the container in response to oscillatory movement of a drive system located outside of the closed interior space and separate from the beverage cartridge. For example, the motion creating structure may include an agitator that includes a first portion located in the interior space and a second portion that extends outside of the interior space. The second portion of the agitator may be arranged to mechanically couple with the drive system so that motion of the drive system may be translated to the first portion of the agitator in the cartridge. The agitator may have a variety of different arrangements, e.g., to cause vibratory motion, stirring, cavitation, or other mixing motion of the beverage medium and/or liquid. In some embodiments, an agitator may be attached to the container and extend into the interior space, e.g., one or more paddles, fingers, fins, tabs or blades may be attached to a container sidewall and extend into the interior space for interaction with the beverage medium, liquid, a filter or other component in the interior space.

In another illustrative embodiment, the motion creating structure may include indentations in the container that are arranged to mechanically couple with the drive system. The indentations may provide mechanical coupling of the container to the drive system, e.g., to allow the drive system to move the cartridge as a whole, or may function to cause movement of the beverage medium or liquid in the container, e.g., the indentations may act as fins, blades or other structures that cause motion of the beverage medium and/or liquid in response to movement of the container.

In another illustrative embodiment, the motion creating structure may include one or more mixing balls that are movable in the interior space independently of the container. The mixing balls may be arranged to create movement of the beverage medium or liquid in the container in response to movement of a container by the drive system, e.g., the container may be rotated in an oscillating manner that causes the balls to rotate relative to the container in the interior space. Alternately, the mixing balls may be caused to move in a random way, vertically or other linear fashion, or otherwise to cause movement of the beverage medium or liquid.

In another embodiment, the motion creating structure may include one or more wall elements in the interior space arranged to cause net rotary movement of the beverage medium or liquid in response to oscillatory rotation of the container. For example, the wall elements may have a zig-zag, a "ramp and stop" or other arrangement capable of causing rotation of the beverage medium and/or liquid in response to oscillatory rotation of the container.

The cartridge may include any suitable features found in beverage cartridges, such as one or more filters, liquid distributors, one or more different types of beverage media in one or more different compartments of the cartridge, liquid or gas inlet or outlet valves or other conduits or ports, etc. For example, the cartridge container may include a cup with a top opening and a lid attached to the cup that closes the top opening. The cup may have a cylindrical shape, a cubic shape, conical or frustoconical shape, partial spherical shape, tetrahedral shape, or others. The cup may be made as a single part, e.g., a single thermoformed piece of plastic, or may be made of multiple parts that are joined together. For example, a cup may include a cylindrical wall member that has a flat plate or foil member attached to one end of the cylindrical wall. Similarly, the lid may be arranged in any suitable way, e.g., may include a single part such as a layer of laminated foil, multiple parts joined together, and so on. In addition, the cartridge may include a filter element arranged to filter at least part of a beverage formed by interaction of the beverage medium with liquid. For example, the filter element may include a filter paper arranged so that liquid interacting with the beverage medium passes through the filter before exiting the cartridge. The filter may be attached to a lid of the container, a container sidewall, or other cartridge component(s).

In another aspect of the invention, a beverage forming system includes a cartridge receiver arranged to hold a beverage cartridge, a liquid inlet (such as a needle that pierces the cartridge) arranged to introduce liquid into the beverage cartridge, and a drive system arranged to provide vibratory or other sonic energy to the beverage cartridge. A beverage cartridge may be held by the cartridge receiver and have an arrangement like that described above, e.g., including a container having a closed interior space, a beverage medium located in the interior space, and a motion creating structure in the closed interior space of the container. The motion creating structure may be arranged, e.g., as discussed above, to cause movement of the beverage medium or liquid in the cartridge relative to the container in response to oscillatory movement of the drive system. The system may be arranged to pierce the cartridge container to form an opening through which beverage exits the container, e.g., a needle may pierce the container to allow beverage to exit the container.

In some embodiments, the drive system and motion creating structure may be arranged to cause materials to pass through a filter in the cartridge that would not pass through the filter in the absence of causing movement of the beverage medium or liquid. For example, when using the system to create a coffee beverage, the drive system and motion creating structure may cause the coffee beverage to be formed with a turbidity and/or a level of total dissolved solids that is higher than would be present in the absence of movement of the beverage medium or liquid by the motion creating structure and the drive system.

In another aspect of the invention, a method for forming a beverage using a beverage cartridge includes providing a beverage cartridge including a container having a closed interior space, a beverage medium located in the interior space, and a motion creating structure in the closed interior space of the container arranged to cause movement of the beverage medium. The beverage cartridge is associated with a brew chamber of a beverage forming machine, e.g., by placing the cartridge in a cartridge receiver of the beverage forming machine. Movement of the motion creating structure is caused while the cartridge is associated with the brew chamber to cause movement of the beverage medium in the closed interior space. Such motion may cause the beverage medium to better interact with liquid (e.g., water) that is introduced into the cartridge when forming a beverage. Improved interaction may result in more complete or faster extraction, more complete or faster mixing, improved passage of liquid and/or other materials through a filter, and/or other features.

In one embodiment, the step of causing movement may include engaging and causing oscillatory motion of an agitator that has at least a portion located in the interior space of the cartridge. For example, the agitator may include a first portion located in the interior space and oscillatory motion of the second portion (which extends outside of the cartridge for engagement with a drive system) causes movement of the first portion. As discussed above, the motion creating structure may be arranged in a variety of different ways, and movement of the motion creating structure may be caused by mechanical engagement with and movement of the motion creating structure, movement of the cartridge container, and/or movement of a drive system component introduced into the cartridge interior.

A sonic emitter or other drive system that provides sonic or vibratory energy may take any one of a variety of forms, such as a probe that is positioned adjacent a portion of the cartridge, a motor and drive linkage, etc. As used herein, "sonic energy" or "vibratory energy" includes energy audible to the human ear as well as energy outside of the range of hearing of the human ear. For example, "sonic energy" or "acoustic energy" or "vibratory energy" can include vibratory energy having a frequency of about 10 Hz to about 200 kHz or more.

These and other aspects of the invention will be apparent from the following description and claims.

BRIEF DESCRIPTION OF THE DRAWINGS

Aspects of the invention are described with reference to the following drawings in which like numerals reference like elements, and wherein:

FIG. 4 shows a cross sectional view of another illustrative embodiment of a cartridge in accordance with an aspect of the invention;

FIGS. 5 and 6 show a front view and a bottom view, respectively, of yet another illustrative embodiment of a cartridge in accordance with an aspect of the invention;

FIGS. 7 and 8 show a front view and a bottom view, respectively, of yet another illustrative embodiment of a cartridge in accordance with an aspect of the invention;

FIGS. 9 and 10 show a front view and a bottom view, respectively, of yet another illustrative embodiment of a cartridge in accordance with an aspect of the invention;

FIGS. 11 and 12 show a front view and a left side view, respectively, of yet another illustrative embodiment of a cartridge in accordance with an aspect of the invention;

FIGS. 13 and 14 show a front view and a bottom view, respectively, of yet another illustrative embodiment of a cartridge in accordance with an aspect of the invention;

FIGS. 15 and 16 show a front view and a top view, respectively, of yet another illustrative embodiment of a cartridge in accordance with an aspect of the invention;

FIGS. 17, 18 and 19 show a front view with a sonic emitter, a front view without sonic emitter and bottom view of yet another illustrative embodiment of a cartridge in accordance with an aspect of the invention;

FIG. 20 is a perspective view of the FIG. 17 embodiment with a modified sonic emitter;

FIGS. 21, 22 and 23 show a front view with a sonic emitter, a front view without sonic emitter and bottom view of yet another illustrative embodiment of a cartridge in accordance with an aspect of the invention;

DETAILED DESCRIPTION

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
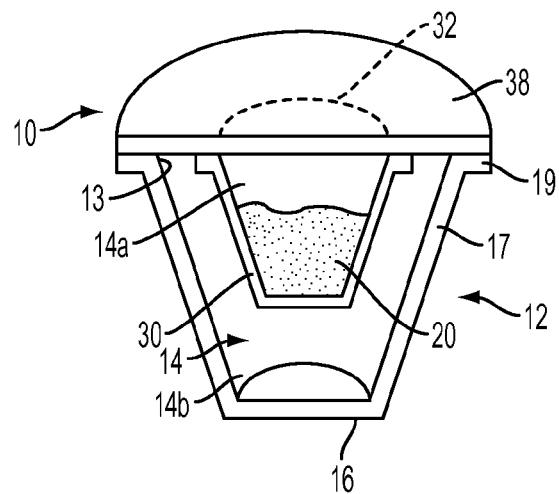
FIG. 1 is a side cross-sectional view of a cartridge in accordance with aspects of the invention.
Figure 2:
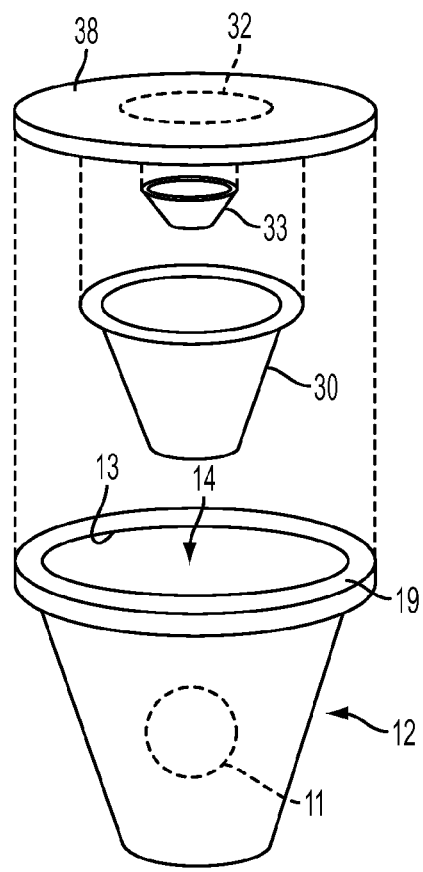
FIG. 2 is an exploded perspective view of the cartridge of FIG. 1.

FIGS. 1 and 2 show a side cross-sectional view and an exploded perspective view, respectively, of an illustrative cartridge 10 that incorporates one or more aspects of the invention. The cartridge 10 may be used in a beverage machine to form any suitable beverage such as tea, coffee, other infusion-type beverages, beverages formed from a liquid or powdered concentrate, carbonated beverages, etc. Thus, the cartridge 10 may contain any suitable beverage medium 20, e.g., ground coffee, tea leaves, dry herbal tea, powdered beverage concentrate, dried fruit extract or powder, powdered or liquid concentrated bouillon or other soup, powdered infant formula, powdered or liquid medicinal materials (such as powdered vitamins, drugs or other pharmaceuticals, nutriceuticals, etc.), and/or other beverage-making material (such as powdered milk or other creamers, sweeteners, thickeners, flavorings, and so on). In one illustrative embodiment, the cartridge 10 contains a beverage medium 20 that is configured for use with a machine that forms coffee and/or tea beverages, however, aspects of the invention are not limited in this respect.

Although illustrative embodiments of cartridges are shown in the drawings, as used herein, a "cartridge" may take any suitable form, such as a pod (e.g., opposed layers of filter paper encapsulating a beverage medium), capsule, sachet or any other arrangement. The cartridge may be impervious to air and/or liquid, or may allow water and/or air to pass into the cartridge. The cartridge may include a filter or other arrangement to help prevent some portions of the beverage medium from being provided with the formed beverage, such as a coffee drink, tea, hot chocolate, etc. To "brew" a beverage as used herein includes infusion, mixing, dissolving, steeping or otherwise forming a drinkable substance using water or other beverage precursor (e.g., flavored or otherwise treated water, or other liquid whether heated or not) with a beverage medium. Also, reference to "water" herein is to any suitable water formulation, e.g., filtered, deionized, softened, carbonated, etc., as well as any other suitable precursor liquid used to form a beverage, such as sweetened or flavored water, milk, etc.

In this illustrative embodiment, the cartridge 10 includes a container 12 that includes an interior space 14 having a first chamber 14a and a second chamber 14b that are separated by a filter 30. It should be understood, however, that other additional chambers in the interior space and/or sub-portions or areas of the first and second chambers, may be provided in other embodiments. For example, this embodiment also includes a flow distributor 33 that may help to distribute incoming liquid across the beverage medium 20, and thus the flow distributor 33 may define an area between the flow distributor 33 and the lid 38. Also, it is possible for the cartridge to have three spaces that are separated by two filters (e.g., a first filter separates two portions of a first chamber and a second filter separates the first and second chambers), and so on. In another embodiment, the first or second chamber may be separated into two portions by a venturi or other feature that introduces air or liquid into a beverage. Thus, the first and/or second chambers may be divided or otherwise separated into two or more portions or areas by filters, walls, dividers, passageways, and other features. Also, it should be appreciated that the cartridge 10 need not include a filter 30, but instead may be filterless.

If the container 12 includes an opening 13 like that shown in FIGS. 1 and 2, the opening 13 may be closed by a lid 38, e.g., a foil and polymer laminate material that is attached to a rim 19 of the container 12. (Although in this embodiment the rim 19 is arranged as an annular flange-like element, the rim 19 may be arranged in other ways. For example, the rim 19 may be the top edge of the sidewall 17 without any flange element.) The container 12 and/or the lid 38 may provide a barrier to moisture and/or gases, such as oxygen. For example, the container 12 may be made of a polymer laminate, e.g., formed from a sheet including a layer of polystyrene or polypropylene and a layer of EVOH and/or other barrier material, such as a metallic foil. Such an arrangement may provide suitable protection for the beverage medium 20, e.g., from unwanted exposure from moisture, oxygen and/or other materials. It should be understood, however, that the container 12 and/or the lid 38 may be made of other materials or combinations of materials, such as biopolymers, compostable polymers, paper, foils, etc.

In accordance with an aspect of the invention, the cartridge 10 may include sonic receiver 11 (see FIG. 2), such as an acoustically compliant portion that receives sonic energy from a sonic emitter which causes the acoustically compliant portion to vibrate or otherwise move. This movement of the acoustically compliant portion may introduce sonic energy into the interior space 14 to interact with the beverage medium 20, a filter 30 (if present) and/or liquid in the interior space 14. The acoustically compliant portion may take any suitable form, which may depend on the arrangement of a sonic emitter used to excite the acoustically compliant portion. For example, the acoustically compliant portion in this illustrative embodiment includes a part of a sidewall 17 arranged to vibrate in response to acoustic energy, but an acoustically compliant portion or other sonic receiver 11 may be arranged at the bottom 16 and/or lid 38 of the container 12. Thus, the material used to form the acoustically compliant portion, the physical shape, thickness or other characteristics of the acoustically compliant portion may be carefully arranged to be excited by acoustic energy so as to provide a desired sonic energy into the interior space 14. For example, a portion of the sidewall 17 may be caused to vibrate by a sonic emitter, which in turn causes the portion of the sidewall 17 to create or otherwise introduce sonic energy into the interior space 14. As discussed in more detail below, the sonic receiver 11 need not include an acoustically compliant section, but rather may be arranged to receive, couple with, or otherwise interact with a sonic emitter that introduces sonic energy into the cartridge 10.

Also, although in this embodiment, the sonic receiver 11 is arranged to cooperate with a sonic emitter that is located outside of the cartridge 10, the sonic receiver 11 may be arranged to cooperate with a sonic emitter located inside of the cartridge 10. For example, a sonic probe inserted into the interior space 14 may emit sonic energy which excites an acoustically compliant portion of the container. In turn, the excitation of the acoustically compliant portion may itself introduce sonic energy into the interior space, optionally at the same or a different frequency and/or intensity as the sonic energy emitted by the probe. This feature may be exploited to help provide desired acoustic energy in the interior space, whether at a desired frequency or amplitude. Moreover, the sonic receiver(s) 11 may be used make the sonic energy more uniform or otherwise distributed in the interior space. For example, whereas a single sonic probe may in some cases form a tunnel or channel in a beverage medium because of the concentration of sonic energy in a narrow area, the sonic receiver(s) 11 may help to more uniformly distribute sonic energy in the interior space 14, thus helping to avoid any tunneling or unwanted concentration of sonic energy in one or more areas. Of course, the sonic receiver(s) 11 may be used to help make sonic energy in the interior space more uniform or have other desired characteristics by interacting with a sonic emitter located outside of the interior space 14.

Although in this illustrative embodiment the container 12 has a generally frustoconical shape with a flat lid, the container 12 may have a fluted, conical, or cylindrical shape, may be in the form of a square or rectangular cup, a domed cup, a sphere or partial sphere, or other suitable form, may have a fluted, corrugated, or otherwise shaped sidewall, and so on. Also, the container 12 need not necessarily have a defined shape, as is the case with some beverage sachets and pods. For example, although the container 12 in this embodiment has a relatively rigid and/or resilient construction so that the container 12 tends to maintain its shape, the container 12 could be made to have a more compliant and/or deformable arrangement, e.g., like a sachet container made from a sheet of deformable material. Thus, an interior space defined by the container 12 may be formed only after the container material is formed around a beverage medium, filter and/or other cartridge components, similar to when two filter paper layers (container material) are joined together around a charge of coffee grounds to form a pod or other form of cartridge. In other embodiments, the size and/or shape of the cartridge container 12 may be defined by the brew chamber in which the cartridge 10 is held.

If provided, the filter 30 may be attached to the lid 38 at a periphery 32 that is spaced inwardly and away from the rim 19. In addition, the filter 30 may extend from the periphery 32 at least partially into the interior space 14. The filter 30 may function to remove materials over a certain size from a liquid, e.g., may remove coffee grounds from liquid in the first chamber 14a, allowing a coffee beverage to pass through the filter 30 to the second chamber 14b. For example, the filter may include a piece of filter paper that is arranged to allow a liquid and dissolved and/or suspended materials of a certain size to pass, yet prevent relatively large particles from flowing through the filter. Of course, the filter 30 may have multiple stages, e.g., a coarse filter portion that filters out relatively large particles, followed by a fine filter portion that filters relatively smaller particles, and so on. In addition, the filter 30 may include one or more portions that function to filter liquid passing through the filter 30, as well as portions that are impermeable or otherwise restrict flow. Thus, the filter 30 may include two or more separate components, if desired. For example, the filter 30 may include a rigid, impermeable plastic sleeve that is attached to the lid 38 at the periphery 32. At a location away from the lid 38, a porous filter paper may be attached to the sleeve. Thus, not all portions of the filter need be permeable to liquids. The filter 30 may also have areas with different permeability, e.g., to help direct flow toward one or more areas of the filter 30. For example, regions of the filter 30 near the lid 38 in FIG. 1 may have a relatively lower permeability as compared to regions further away from the lid 38. This may help encourage flow through the beverage medium 20 toward lower regions of the filter 30, potentially improving the dissolution of materials in the medium 20 into the liquid.

As described in more detail below, the operation of the filter may be influenced by sonic energy in the interior space, e.g., materials that would otherwise not pass through the filter may be caused to pass by the sonic energy. For example, attaching the filter 30 to the lid 38 may be useful in some embodiments where a portion of the lid 38 functions as an acoustically compliant portion. That is, a sonic emitter may excite a portion of the lid 38, and since the lid 38 may be connected to the filter 30, both the filter and lid 38 may be excited so as to introduce sonic energy into the interior space 14. Sonic excitation of the filter 30 may help certain materials pass through the filter 30 that would otherwise not pass through the filter in the absence of sonic energy. Of course, the filter 30 may be sonically excited in other ways, such as by transmitting acoustic energy through the cartridge sidewall 17.

In another aspect of the invention, the filter 30 may also, or alternately, function to help prevent the movement of materials from the second chamber 14b to the first chamber 14a, and/or help position certain beverage materials in the interior space 14 for sonic treatment. For example, the cartridge 10 may include a beverage medium 20 in the second chamber 14b and no beverage medium 20 in the first chamber 14a. In this case, the filter 30 may help maintain the beverage medium 20 near the bottom 16 and/or sidewall 17. Such positioning of the beverage medium 20 may help expose the beverage medium to desired acoustic energy, e.g., if the energy is introduced from the sidewall 17 and/or bottom 16. For example, some beverage media 20, such as powdered drink mixes, can tend to clump and may clog or otherwise foul a beverage outlet if not properly dissolved. By suitably exposing the drink mix to acoustic energy near the bottom 16 or sidewall 17 of the cartridge 10, the drink mix may dissolve or otherwise go into solution more quickly or effectively than would otherwise occur. For example, the inventors have discovered that introducing acoustic energy into the interior space 14 of a cartridge 10 can cause flow of the beverage medium 20 and liquid that would not occur in the absence of such energy. In some cases, the swirling or other flow can help dissolve a beverage medium or otherwise improve contact of the medium with a liquid.

Figure 3:
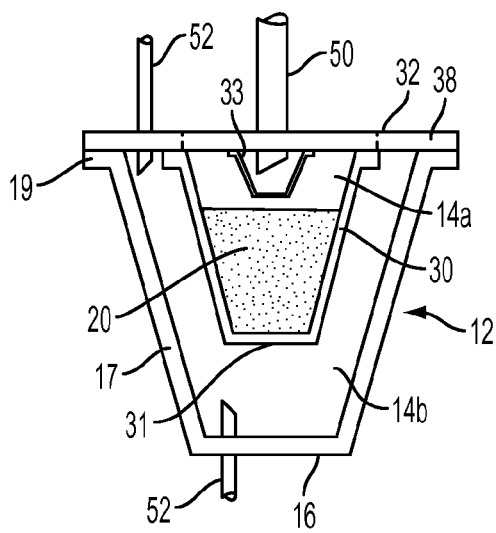
FIG. 3 is a side cross-sectional view of the cartridge of FIG. 1 after a surface of the cartridge is pierced by a piercing element.

When using the cartridge 10 to form a beverage, the lid 38 and/or the container 12 may be pierced to introduce liquid into the cartridge and receive beverage from the cartridge. (As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.) To introduce liquid into the cartridge, for example, as shown in FIG. 3, a portion of the lid 38 generally circumscribed by the periphery 32 where the filter 30 (if present) is attached to the lid 38 may be pierced by an inlet piercing element 50 (e.g., a needle) so that water or other liquid may be injected into the cartridge 10. Of course, other piercing approaches may be used, e.g., where the filter 30 is attached to the container sidewall 17. Other inlet piercing arrangements are possible, such as multiple needles, a shower head, a non-hollow needle, a cone, a pyramid, a knife, a blade, etc. A beverage machine that uses the cartridge may include multiple piercing elements of the same type or of different types, as the invention is not limited in this respect. In another arrangement, a beverage machine may include a piercing element (such as a spike) that forms an opening and thereafter a second inlet element (such as a tube) may pass through the formed hole to introduce liquid into (or conduct liquid out of) the container. For those arrangements in which the cartridge is pierced, a sonic emitter may be introduced into the interior space 14. For example, a piercing element 50 (e.g., needle) may function to pierce the cartridge, introduce water into the cartridge, and emit sonic energy in the interior space 14. Thus, a piercing inlet needle may function as a sonic emitter as well as provide liquid into the container. In other embodiments, the lid 38 may be pierced, or otherwise effectively opened for flow, by introducing pressure at an exterior of the lid 38. For example, a water inlet may be pressed and sealed to the lid 38 exterior and water pressure introduced at the site. The water pressure may cause the lid 38 to be pierced or otherwise opened to allow flow into the cartridge 10. In another arrangement, the lid 38 may include a valve, conduit or other structure that opens when exposed to a suitable pressure and/or when mated with a water inlet tube or other structure. In such cases the water (or other liquid) inlet may still function as a sonic emitter, although the liquid inlet may not extend into the interior space 14. In some arrangements, liquid may be introduced into the cartridge so that all or a substantial portion of air or other gas in the cartridge is vented or otherwise removed. This may help couple components in the cartridge interior (beverage medium, filter, liquid, etc.) with a sonic emitter.

The cartridge 10 may also be penetrated by an outlet piercing element 52 (e.g., a needle) at a bottom 16 of the container 12, or at a second portion of the lid 38 outside of the periphery 32 and apart from the inlet opening, or at another portion of the cartridge 10, such as the sidewall 17. (The liquid inlet may similarly be located at any suitable place or places on the cartridge 10.) As with the inlet piercing arrangement, the outlet piercing arrangement may be varied in any suitable way. Thus, the outlet piercing element 52 may include one or more hollow or solid needles, knives, blades, tubes, and so on. Such piercing elements 52 may also function as a sonic emitter, or open a path through which a sonic emitter may enter the interior space or otherwise communicate with the cartridge 10. Alternately, the cartridge 10 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element 52 remains in place to receive beverage as it exits the opening formed in the container 12 or lid 38. However, in other embodiments, the piercing element 52 may withdraw after forming an opening, allowing beverage to exit the opening and be received without the piercing element 52 being extended into the cartridge 10.

Although the embodiments described above include a beverage medium 20 only in the first chamber 14a, or only in the second chamber 14b, the cartridge 10 may include a beverage medium (either the same or different) in both chambers or other portions of the cartridge. For example, a cartridge may include roast and ground coffee in the first chamber 14a, and a creamer and sweetener in the second chamber 14b, enabling the cartridge to form a cappuccino- or latte-like beverage. In another embodiment, the first chamber 14a may include coffee grounds and the second chamber 14b may include a hot chocolate material, allowing the cartridge to form a mocha-type beverage. Other combinations will occur to those of skill in the art, such as leaf tea in the first chamber and a dried fruit material in the second chamber, a dried fruit material in the first chamber and creamer/sweetener in the second chamber, and so on. In some embodiments, another filter may be provided, e.g., to separate beverage media in the second chamber from the fluid outlet. For example, a filter may be attached to the lid 38 in an area where an outlet needle pierces the lid 38 to allow beverage to exit the cartridge, but only after passing through the additional filter. The selection of which beverage media to place in which areas of the cartridge 10 may be made based on the desired acoustic treatment to be given the beverage media. For example, certain hard-to-dissolve beverage media may be located so as to experience a relatively higher acoustic energy intensity, whereas other beverage media may be located in lower intensity regions. Thus, the cartridge interior space 14 may have regions with different acoustic energy characteristics, and those acoustic energy characteristics may be tuned or otherwise controlled for particular beverage media or other affects on beverage media.

FIG. 4 shows another illustrative embodiment of a cartridge 10 which in this case includes a sonic receiver 11 located at the sidewall 17 of the container 12. The sonic receiver 11, which may be arranged as a notch, recess or other depression in the container 12, receives a sonic emitter 53, which in this instance has the form of an ultrasonic probe. The depression 11 may have any suitable configuration, e.g., may be tapered so as to closely fit with a tapered end of the sonic emitter 53, may include an acoustically compliant portion that vibrates in response to sonic energy emitted by the sonic emitter 53, may be substantially transparent to sonic energy emitted by the emitter 53 so as to have minimal attenuation on the energy, may provide an acoustic coupling between the emitter 53 and the interior space (e.g., the sonic receiver 11 may include a suitable acoustic gel, water or other substance that functions as an acoustic coupling medium), etc. In an arrangement where the depression 11 is configured to vibrate in response to sonic energy from the emitter 53, the depression 11 or other feature may function as motion creating structure in the interior space that causes beverage medium and/or liquid to move relative to the container 12. Of course, the shape and size of the depression may vary, e.g., the depression may have a round, square, rectangular, triangular, etc., cross sectional shape, may be sized to interact with the sonic emitter 53 in a desired way, may be formed of a different material than other portions of the container 12 (e.g., may include an element with desired acoustic characteristics that is molded into the sidewall 17), and so on. In this case, the sonic receiver 11 is located below a filter 30 (e.g., downstream of the filter 30), but may be arranged to be adjacent to or in immediate contact with the beverage medium 20, the filter 30 or other components of the cartridge 10. (Note that in this embodiment, the filter 30 is attached to the container 12 sidewall 17, but the filter 30 could be arranged in any way in the cartridge 10, e.g., as part of the container bottom or sidewall where a beverage exits.) Sonic energy emitted by the sonic emitter 53 and/or by an acoustically compliant portion of the cartridge 10 may be in the about 10 Hz to 200 kHz range with any suitable intensity, although other frequency ranges and/or intensities are possible.

By having the sonic emitter extend into a depression in the container 12, the sonic emitter 53 may effectively be located inside the cartridge while actually remaining outside of the interior space 14. That is, since the depression may extend into the interior space 14 of the cartridge 10, the sonic emitter 53 may be located so as to effectively introduce sonic energy from within the interior space 14, rather than effectively introducing the sonic energy from outside of the interior space. This arrangement may allow the sonic emitter 53 to provide may uniform sonic energy to the interior space, may permit sonic energy to be concentrated in certain areas of the interior space, and so on. Thus, the sonic emitter 53 in arrangements like that in FIG. 4 may be able to function in a way similar to a sonic emitter that pierces the cartridge and extends into the interior space, but without the potential disadvantages of a piercing probe, such as potential contamination of the beverage, leaking from the emitter piercing site, damage to the sonic emitter by contacting the beverage medium and/or liquid, etc. In addition, the sonic receiver 11 may focus, diffuse, redirect, or otherwise change the way the sonic energy is introduced in the interior space. For example, the sonic receiver 11 may receive diffuse sonic energy, and focus that energy into a suitable area or zone in the interior space 14.

FIGS. 5 through 16 show various additional embodiments of a cartridge 10 having different sonic receiver arrangements. However, it should be understood that these illustrative embodiments are not intended to provide an exhaustive review of all possible ways in which an sonic receiver could be arranged in accordance with aspects of the invention. For example, FIG. 5 shows a front view and FIG. 6 shows a bottom view of a cartridge 10 that includes a sonic receiver 11 in the form of a notch or step at a lower right side of the container 12. FIG. 7 shows a front view and FIG. 8 shows a bottom view of a cartridge 10 that includes a sonic receiver 11 in the form of a notch located at a lower, front right side of the container 12. FIG. 9 shows a front view and FIG. 10 shows a bottom view of a cartridge 10 that includes a sonic receiver 11 in the form of a notch at a lower front, center of the container 12. FIG. 11 shows a front view and FIG. 12 shows a left side view of a cartridge 10 that includes a sonic receiver 11 in the form of cylindrically-shaped depression in the sidewall 17 of the container 12. In this embodiment, the depression extends into contact with a filter 30 in the container 12, although the depression need not contact the filter 30. In the FIGS. 11 and 12 embodiments, as with other embodiments, the sonic receiver 11 may include more than just the depression. For example, an acoustic coupling gel or other substance could be placed in the depression and used to acoustically couple the sonic emitter 53 with the cartridge interior. In other embodiments, the sonic receiver 11 may include only the acoustic coupling gel, e.g., applied to the exterior of a cartridge, or any other suitable acoustic coupling material, such as water. FIG. 13 shows a front view and FIG. 14 shows a bottom view of a cartridge 10 that includes a sonic receiver 11 in the form of a cylindrically-shaped depression that extends upwardly from the bottom 16 of the container 12. In this embodiment, the depression does not extend to the filter 30, but the depression could optionally extend to the filter 30 or beyond the filter 30 and into a space above the filter 30. FIG. 15 shows a front view and FIG. 16 shows a top view of a cartridge 10 that includes a sonic receiver 11 in the form of cylindrically-shaped depression that extends downwardly from the lid 38 into the interior space of the container 12. The sonic receiver 11 in this embodiment may include a cylindrically-shaped cup that is attached to a hole in the lid 38, or may be molded or otherwise formed into the lid material.

Of course, it should be understood that the sonic receivers 11 may be arranged to have other sizes, shapes or other configuration details as discussed above. Moreover, two or more sonic receivers 11 may be provided, and the sonic receivers 11 may have different positions on the container, different sizes, shaped, etc. The sonic receivers 11 may include acoustically compliant portions, or not, as desired. In the absence of an acoustically compliant portion, the sonic receivers 11 may receive or otherwise couple with a sonic emitter 53 so as to enable the sonic emitter 53 to introduce sonic energy into the cartridge 10.

In other illustrative embodiments, a sonic receiver 11 may be arranged to be received by a sonic emitter 53 rather than to receive the sonic emitter 53. FIGS. 17-19 show a front view with a cartridge 10 engaged with a sonic emitter 53, a front view of the cartridge 10 alone, and a bottom view of the cartridge 10, respectively in another illustrative embodiment. In contrast to the embodiments shown in FIGS. 5-16, the embodiment in FIGS. 17-19 has a sonic receiver 11 arranged to be at least partially surrounded by a sonic emitter 53. That is, the lower portion of the container 12 is arranged to form a sonic receiver 11 that is inserted into a cavity of a sonic emitter 53. A portion of the sonic emitter 53 may include one or more beverage outlets 52, although other arrangements are possible, such as where a beverage exits from the lid 38 or sidewall 17 of the cartridge 10. With the sonic receiver 11 at least partially surrounded by the sonic emitter 53, the emitter 53 may transmit sonic energy into the cartridge 10 from one or more regions around the exterior of the sonic receiver 11, including the bottom 16 of the container 12. In other arrangements, such as that shown in FIG. 20, the bottom of the container 12 may extend from the sonic emitter 53, e.g., allowing beverage to exit the container 12 without passing through the sonic emitter 53. Although the embodiments in FIGS. 17-20 show the sonic receiver 11 arranged to have a cylindrical shape, other shapes are possible, such as a tapered conical shape like that shown in FIGS. 21-23. FIGS. 21-23 show a front view with a cartridge 10 engaged with a sonic emitter 53, a front view of the cartridge 10 alone, and a bottom view of the cartridge 10, respectively. The tapered shape of the sonic receiver 11 in this embodiment may allow the sonic emitter 11 to fit snugly against the sonic emitter 53, which may enhance the acoustic coupling between the sonic emitter 53 and the cartridge interior. Coupling between the sonic emitter 53 and the cartridge may be enhanced in this or other embodiments in other ways, such as by using a compliant coupling medium (such as a silicone or rubber material as part of the sonic receiver 11 that interfaces with emitter 53), use of a liquid coupling medium (such as water), using a sonic emitter 53 that has a portion that enlarges or reduces in size to clamp within or around the receiver 11, providing interlocking corrugations in the cartridge container and sonic emitter 53 or otherwise increasing the contact area between the cartridge and the emitter to enhance energy transmission, pressing down on the top of the cartridge (or other cartridge portion) to help force the cartridge into contact with the emitter 53, etc.

Figure 24:
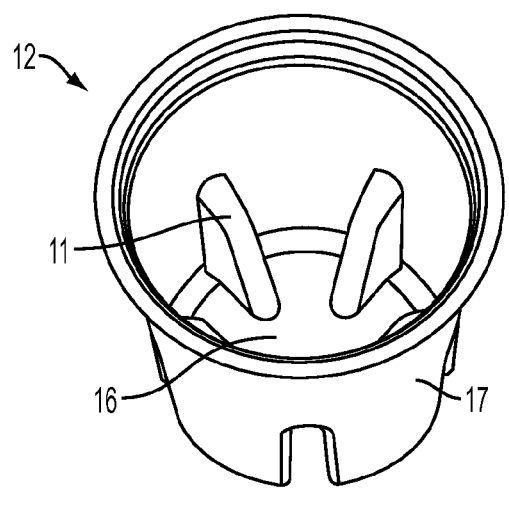
FIGS. 24 and 25 show a top perspective view and a bottom perspective view, respectively, of a cartridge container including motion creating structure in the form of indentations in the container.
Figure 25:
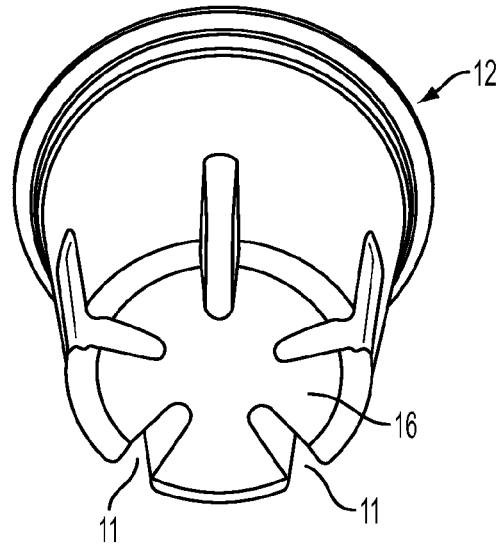

While in the embodiments above, the container 12 tends to remain relatively stationary, other arrangements may involve a sonic emitter or other vibratory drive system that moves the container to a somewhat greater extent so as to cause movement of beverage medium, liquid and/or other components in the cartridge. For example, FIGS. 24 and 25 show top perspective and bottom perspective views of a container 12 of a cartridge 10 that includes a plurality of sonic receiver features in the form of indentations 11 formed into the sidewall of the container 12. These indentations 11 may function to mechanically couple with a drive system so that the drive system can move the container 12 in an oscillatory manner. For example, the drive system may include fins or tabs that engage with a corresponding indentation 11 of the container 12 and allow the drive system to rotate the container in an oscillatory manner about an axis that is generally perpendicular to the bottom 16 of the container 12. The container may be oscillated at any suitable amplitude, such as up to 10 to 15 degrees, or more (e.g., up to 30 degrees). Oscillating rotation of the container 12 may cause the indentations 11 to operate as a motion creating structure in the container 12, e.g., as agitators that serve to cause movement of the beverage medium, liquid or other components in the container 12. For example, the indentations may create vortices in a liquid or otherwise cause the liquid to flow or move relative to the container 12. In some embodiments, the drive system may oscillate the container 12 at a resonant frequency of the indentations 11 so that movement of the indentations relative to other portions of the container 12 may be amplified. In other embodiments, the indentations 11 may be relatively rigid so that fins or paddles formed by the indentations 11 do not move appreciably relative to other portions of the container 12. In some arrangements, the drive system may oscillate the cartridge in other ways, such as in a linear up-and-down motion along an axis perpendicular to the bottom 16, in a rotary and/or linear manner about an axis parallel to the plane of the bottom 16, in a random fashion, and so on. Oscillation of the cartridge may be performed before, during or after a time that liquid is provided to the cartridge, e.g., "dry" shaking of the cartridge may help loosen or unpack a beverage medium to make the medium more easily wetted by later introduced liquid. Of course, the shape, arrangement, relative size and other features of the indentations 11 in FIGS. 24 and 25 may be altered in any suitable way, such as having the indentations 11 may be arranged horizontally, in a spiral fashion, or otherwise. Moreover, motion creating structures, such as an agitator arrangement, need not necessarily be formed by indentations in the container 12. Instead, an agitator may include one or more paddles, fingers, fins, tabs or blades that are attached to the container 12, filter 30 or other component (such as an insert placed into the container 12) and extend into the interior space. Vibratory motion of the container 12 or other cartridge element may cause the agitators to interact with the beverage medium and/or liquid to cause motion relative to the container.

Figure 26:
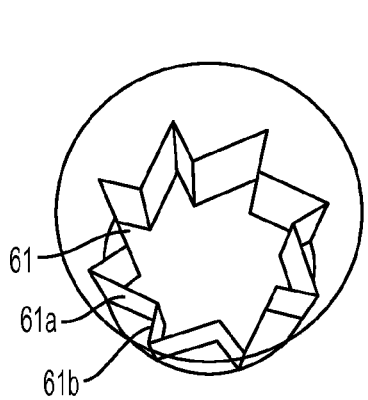
FIGS. 26 and 27 show a top perspective view and a side view, respectively, of a cartridge container including motion creating structure in the form of zig-zag wall elements.
Figure 27:
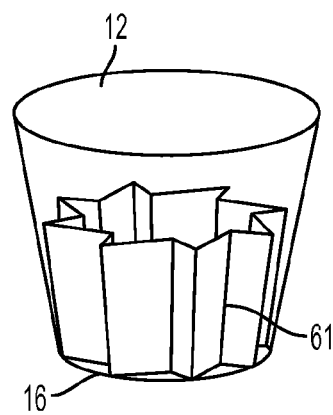

FIGS. 26 and 27 shows a top perspective view and a side view of another illustrative embodiment that includes motion creating structure that causes movement of the beverage medium and/or liquid in the cartridge relative to the container in response to oscillatory movement of a drive system located outside of the closed interior space and separate from the beverage cartridge. In this embodiment, the motion creating structure includes a plurality of wall elements 61 that are arranged adjacent a periphery of the container 12 and are adapted to cause net rotary movement of the beverage medium or liquid in response to oscillatory rotation of the container 12. That is, the wall elements 61 are arranged in a suitable zig-zag, "ratchet," or "ramp and stop" arrangement so that as the container 12 is rotated clockwise about an axis that is perpendicular to the bottom 16 (from the perspective of FIG. 26), beverage medium and/or other materials may slide along relatively shallow angle wall elements 61a. However, when the container 12 is rotated counterclockwise about the axis perpendicular to the bottom 16, beverage medium and other materials are pushed in the counterclockwise direction by steeper angle wall elements 61b. Thus, oscillatory rotation of the container 12 may cause a net rotation of the beverage media and/or other materials in the container 12. The wall elements 61 may be provided as features of the container sidewall 17, as features of a filter 30, or as part of another element.

In another illustrative embodiment, a motion creating structure may include one or more mixing balls that are movable in the interior space of the cartridge independently of the container. Movement of the mixing balls may create movement of the beverage medium or liquid in the container in response to movement of a container by the drive system. For example, several spherical balls may be placed in the first and/or second chamber 14a, 14b of the FIG. 1 embodiment. Movement of the container 12 by a drive system (e.g., that clamps the container 12 in a holder that moves in an oscillatory way) may cause the balls to move in the container 12, e.g., in rotary, linear up-down or side-to-side, random or other motions, to cause movement of the beverage medium and/or liquid in the container. In one embodiment, the balls may be magnetic, and the drive system may operated by magnetic coupling to move the balls in a suitable way. Thus, the balls may be moved within the container 12 without movement of the container 12 itself being required. Movement of the balls may be vibratory in nature (whether rotary and/or linear) and at any suitable frequency, such as from 10 Hz to 200 kHz, as is the case with other embodiments of motion creating structure. While the term "balls" is used regarding this embodiment, the "balls" need not be spherical, but instead may have a cubic, tetrahedral, cylindrical, irregular or other suitable shape.

One experiment regarding the use of mixing balls was conducted in which a cartridge like that in FIG. 24 was coupled to a drive system that rotated the cartridge about a vertical axis perpendicular to the bottom of the container. The container was vibrated at a frequency of about 10 Hz, and at an amplitude of about 30 degrees. The container was arranged to have three indentations about 4 mm deep arranged in the sidewall of the container. Vibratory motion of the container was observed to elicit substantial movement of the surface of water placed in the container. Two ball bearings were added to the container, and the balls were observed to bounce across the diameter of the container about once per second. The two ball bearings were then removed and replaced with two plastic pellets, about 4 mm in diameter. Vibratory motion of the container also showed agitated motion of water in the container as well as bouncing of the plastic pellets across the diameter of the container.

Figure 28:
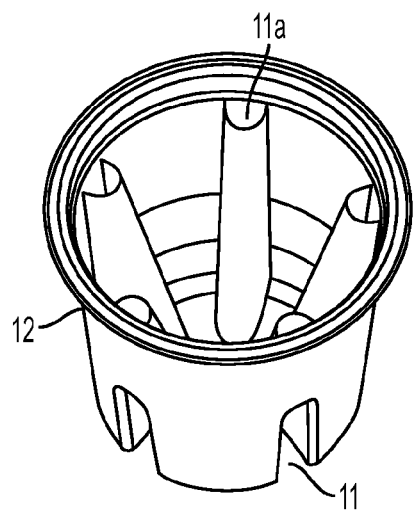
FIGS. 28 and 29 show a top perspective view of a cartridge with a motion creating structure in the form of an insert, and a side view of the insert having vertical paddles.
Figure 29:
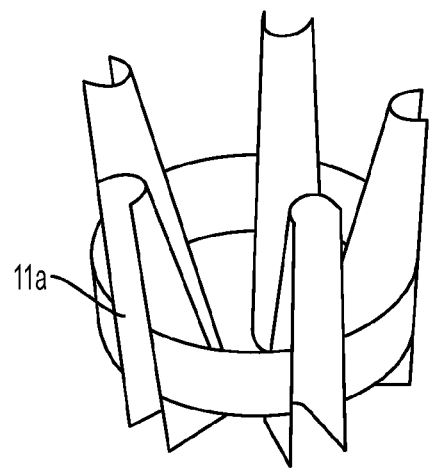

Other configurations of elements that may be added to the interior space of a cartridge container are possible. For example, FIGS. 28 and 29 show a container 12 like that of FIG. 24 and an associated agitator 11a that includes a plurality of vertical paddles that are connected together by peripheral band elements. In this embodiment, the paddles are arranged to fit over indentations 11 in the container 12, e.g., so that rotation or other movement of the container 12 may be transmitted to the agitator 11a, but other arrangements are possible. For example, an agitator 11a like that in FIG. 29 may be provided with an interference fit inside of a container 12, inside of a filter 30 (e.g., such as a filter 30 like that in FIG. 1) and/or in other ways. Arranging the motion creating structure as an insert to a container 12 may ease manufacturing of the motion creating structure, as well as allow customization of motion creating structure for different types of beverage media. For example, some beverage media, such as drink mixes, may require higher amplitude or otherwise more vigorous motion to achieve a desired result, whereas other beverage media, such as tea leaves, may require little or no motion at all to achieve a desired result. Thus, for containers having a drink mix one type of motion creating insert may be placed in the container, whereas for containers having different type of beverage medium, another type of motion creating insert may be placed in the container (or no insert at all).

Figure 30:
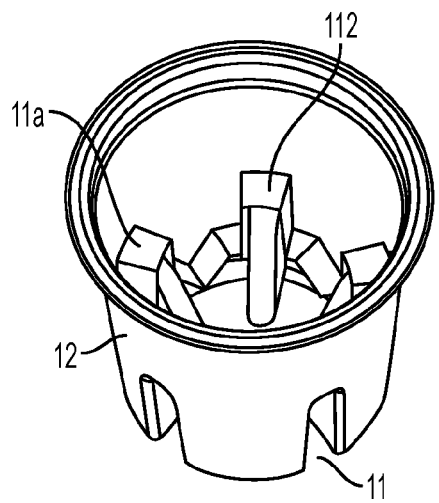
FIGS. 30 and 31 show a top perspective view of a cartridge with a motion creating structure in the form of an insert, and a side view of the insert having scraper elements.
Figure 31:
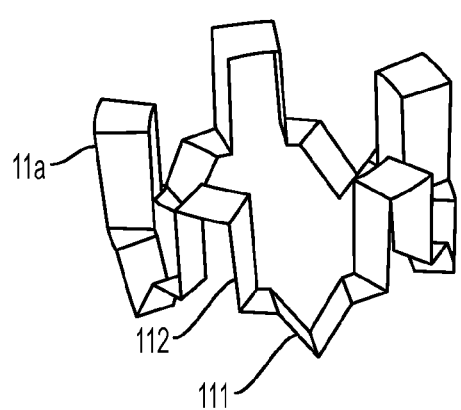

FIGS. 30 and 31 show another illustrative arrangement in which an agitator 11a is received in a container 12 like that of FIG. 24. In this embodiment, the agitator 11a includes scraper portions 111 between indentation engagement portions 112. As can be seen in FIG. 30, the indentation engagement portions 112 fit over and engage with indentations 11 of the container 12. As a result, movement of the container 12 can be translated to the agitator 11a. In some embodiments, the scraper portions 111 may move at least somewhat independently of the indentation engagement portions 112 so that the lowermost part of the scraper portions 111 can scrape, contact or otherwise agitate materials near the bottom 16 of the container 12. This arrangement may be useful, for example, when seeking to help ensure that beverage media near the bottom of the container 12 is fully dissolved or otherwise suitably interacts with water or other liquid in the container 12. In some cases, the agitator 11a may be excited at a resonant frequency of the scraper portions 111 so that the scraper portions 111 move with an enhanced amplitude relative to the container 12 and/or other portions of the agitator 11a, such as the indentation engagement portions 112.

Figure 32:
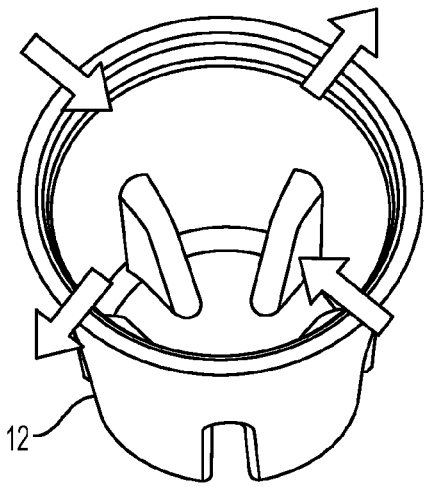
FIGS. 32 and 33 show top perspective views of a cartridge undergoing one form of dilatational movement.
Figure 33:
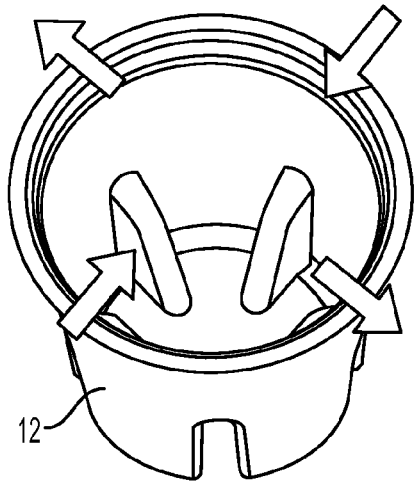
Figure 34:
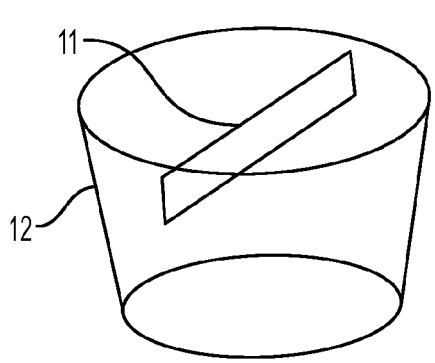
FIGS. 34 and 35 show top perspective views of a cartridge including motion creating structure in the form of a flexible beam.
Figure 35:
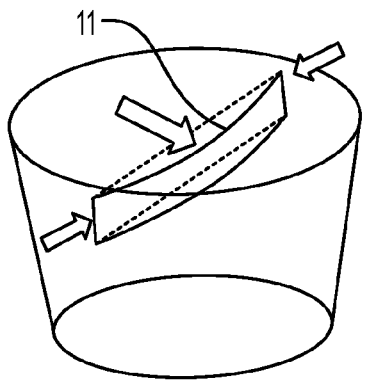

While several embodiments above have been described in relation to motion of a cartridge container 12 about an axis generally perpendicular to its bottom 16, it should be appreciated that motion creating structure may cause suitable motion of beverage media, liquid or other components in a cartridge in response to other types of motion. For example, FIGS. 32 and 33 show a way in which a cartridge container 12 like that in FIG. 24 may be moved in a dilatational way, e.g., so that as one pair of opposed portions of the container sidewall 17 move towards each other, another pair of opposed portions of the sidewall 17 may move away from each other, and vice versa. Thus, the container sidewall 17 may oscillate so as to change the shape of the container 12, albeit slightly in some embodiments. Such movement may cause some agitator or other motion creating structure arrangements to cause movement of materials in the container 12. For example, the agitator 11a in FIGS. 30 and 31 may be arranged to move the scraper portions 111 relative to the container bottom 16 in response to dilatational movement like that shown in FIGS. 32 and 33. Of course, other motion creating structure may be used with dilatational vibration like that shown in FIGS. 32 and 33, or other dilatational vibration such as where a container 12 like that in FIG. 24 oscillates in vertical dimension, as opposed to, or in addition to, a horizontal dimension like that in FIGS. 32 and 33. FIGS. 34 and 35 show a schematic view of another arrangement in which motion creating structure in a cartridge container 12 includes a flexible beam 11 that extends from one side of the container 12 to the other. As the container 12 is moved dilatationally in a horizontal dimension, the beam 11 may alternate between a generally straight or other starting arrangement and a bowed or other displaced arrangement. As will be understood, movement of the beam 11 may operate to mix or otherwise cause movement of materials in the container 12.

Figure 36:
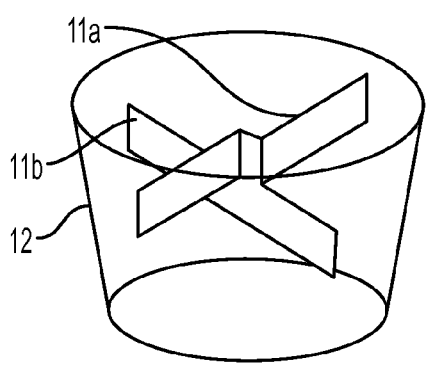
FIGS. 36 and 37 show top perspective views of a cartridge including motion creating structure in the form of drive beam and paddle.
Figure 37:
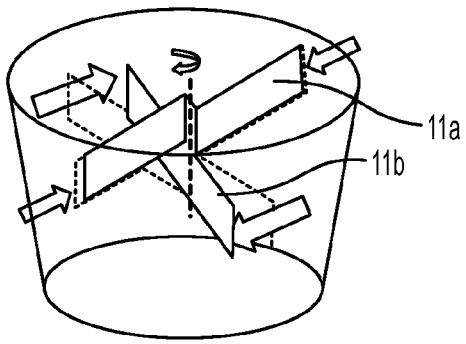

FIGS. 36 and 37 show another illustrative embodiment that is somewhat similar to that shown in FIGS. 34 and 35. In this embodiment, an agitator includes a drive beam 11a and a paddle 11b. The drive beam 11a extends across the container 12, but unlike the arrangement in FIG. 34, the drive beam 11a has a "Z" shape such that two long and generally straight legs are offset from each other near the center of the container 12 and are joined together by a short leg. The paddle 11b is connected to the short leg so that as the two long legs are moved toward and away from each other, the short leg and the attached paddle 11b rotate about a generally vertical axis. As will be understood, the amplitude of dilatational vibration, the length of the short leg, the size of the paddle and/or other features may be suitably arranged to cause desired movement in the container 12.

Figure 38:
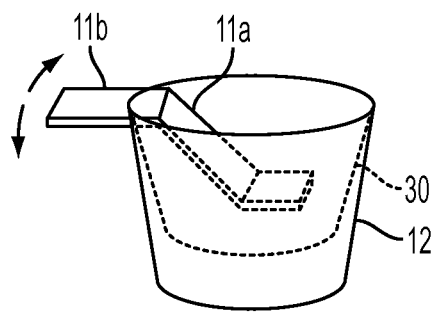
FIGS. 38 through 43 shows perspective views of different motion creating structure including a first portion located in the interior space of the cartridge and a second portion extending outside of the interior space.
Figure 39:
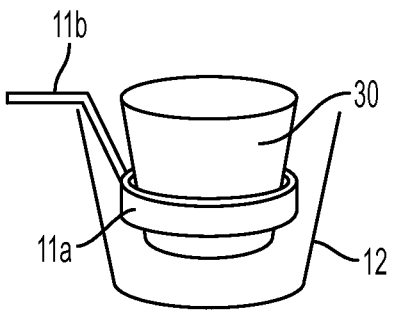
Figure 40:
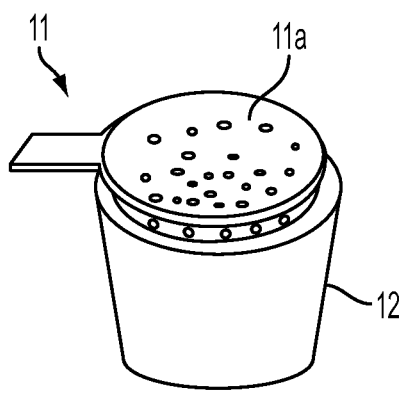
Figure 41:
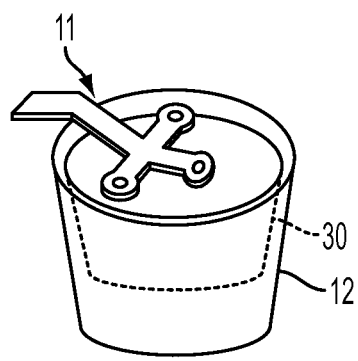
Figure 42:
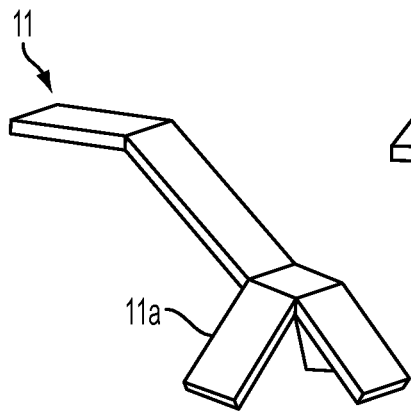
Figure 43:
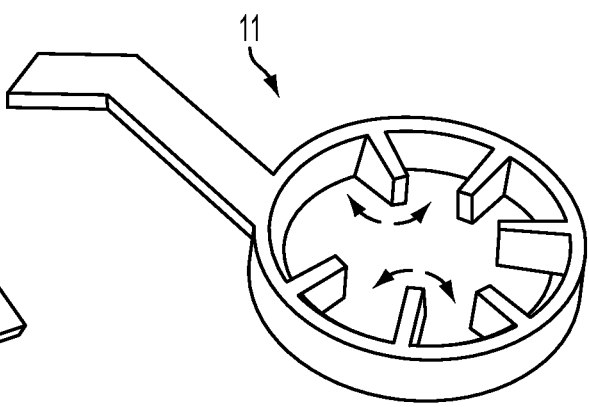

While in many of the embodiments above, motion creating structure may be contained entirely inside of a container 12, in one aspect of the invention, motion creating structure may include a first portion in the interior space of a container and a second portion outside of the interior space. This arrangement may allow a drive system to directly contact the second portion of the motion creating structure and allow the motion of the drive system to be transmitted to the first portion. Such an arrangement may allow for more efficient transfer of motion from a drive system to motion creating structure in a cartridge. FIG. 38 shows a perspective view of one embodiment in which motion creating structure, e.g., an agitator, includes a first portion 11a in the container 12 and a second portion 11b outside of the container 12. In this embodiment, the first portion 11a of the agitator includes a "spoon" type shape that may be moved by a drive system moving the second portion 11b up and down (as shown by the arrows), side to side, or in other ways. In this arrangement, the first portion 11a is located in a space defined by a filter 30, but other arrangements are possible, such as those that do not include a filter 30. In another embodiment of FIG. 39, the first portion 11a includes a ring or hoop shape that extends around a periphery of a filter 30. Thus, when a second portion 11b is moved, the first portion 11a may engage with and move the filter 30, e.g., to cause movement of beverage media inside of the filter. In another illustrative embodiment of FIG. 40, the first portion 11a of the motion creating structure may function as a filter 30 as well, e.g., including a plurality of suitably sized, shaped and arranged holes in a cup. Alternately, the first portion 11a may function as a flow diverter, e.g., slowing, spreading or otherwise modifying flow of liquid and/or other materials in the cartridge. In another embodiment shown in FIG. 41, the first portion 11a of an agitator may include a plurality of rings or other orifices, e.g., to help with emulsification or other treatment of beverage media or other components in a containers. FIG. 42 shows yet another embodiment that includes three (or more) "fingers" or other elements that may be used for mixing, assisting in wetting of beverage media, and/or other functions. FIG. 43 shows another illustrative embodiment in which a first portion includes a ring with inwardly extending fins. Oscillatory movement of the first portion 11a may cause the fins to vibrate back and forth (as shown by the arrows). As with any embodiments, motion creating structure may be driven so as to cause one or more portions of the structure to vibrate at a resonant frequency, which may amplify or otherwise enhance the effect of the motion creating structure.

Figure 44:
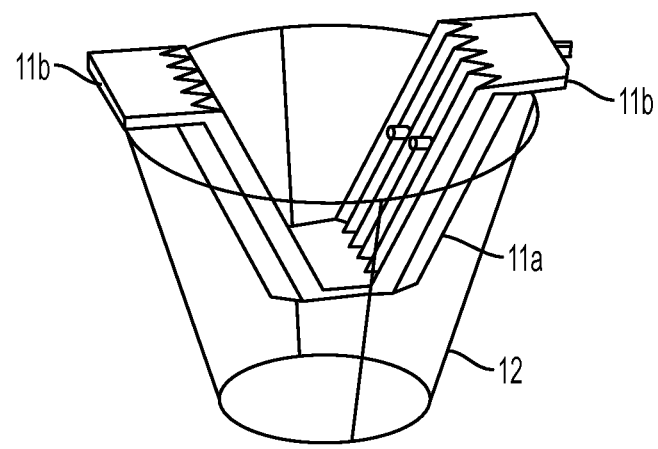
FIGS. 44 and 45 shows perspective views of a cartridge including motion creating structure having "V" shaped sides and a flat bottom portion.
Figure 45:
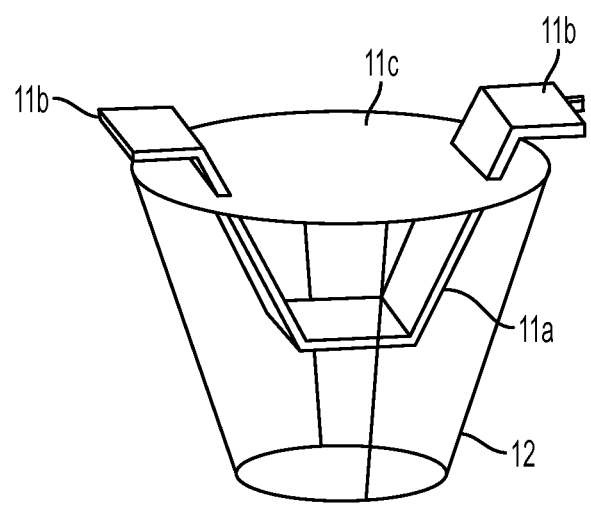

FIG. 44 shows another embodiment of motion creating structure that includes a first portion 11a in the cartridge interior space, and a pair of portions 11b that extend outside of the interior space. This arrangement may allow a drive system to engage both portions 11b of the motion creating structure, which may allow the drive system to more efficiently or otherwise effectively cause motion of the first portion 11a, e.g., the lowermost bottom portion of the motion creating structure. In this illustrative embodiment, the "V" shaped sides of the first portion 11a are corrugated to provide additional stiffness to these parts of the motion creating structure. For example, FIG. 45 shows a similar arrangement for a motion creating structure, with a difference being that the depending sides of the "V" are not corrugated. Testing has found that movement of the lowermost flat portion between the "V" sides in the FIG. 44 embodiment moves up to three times more than the corresponding flat portion in the FIG. 45 embodiment. It is believed that the higher stiffness of the "V" sides in the FIG. 45 embodiment due to the corrugations provides this result. The first portion 11a may be arranged to focus acoustic energy produced by the "V" sides in the interior space, e.g., in a region between the "V" sides. This may help create a relatively high energy focal zone, potentially sufficient to cause cavitation in a liquid. In the FIG. 45 embodiment, a reflector 11c may be provided to help intensify acoustic energy in the interior space and/or help create or maintain a focal zone of energy.

Figure 46:
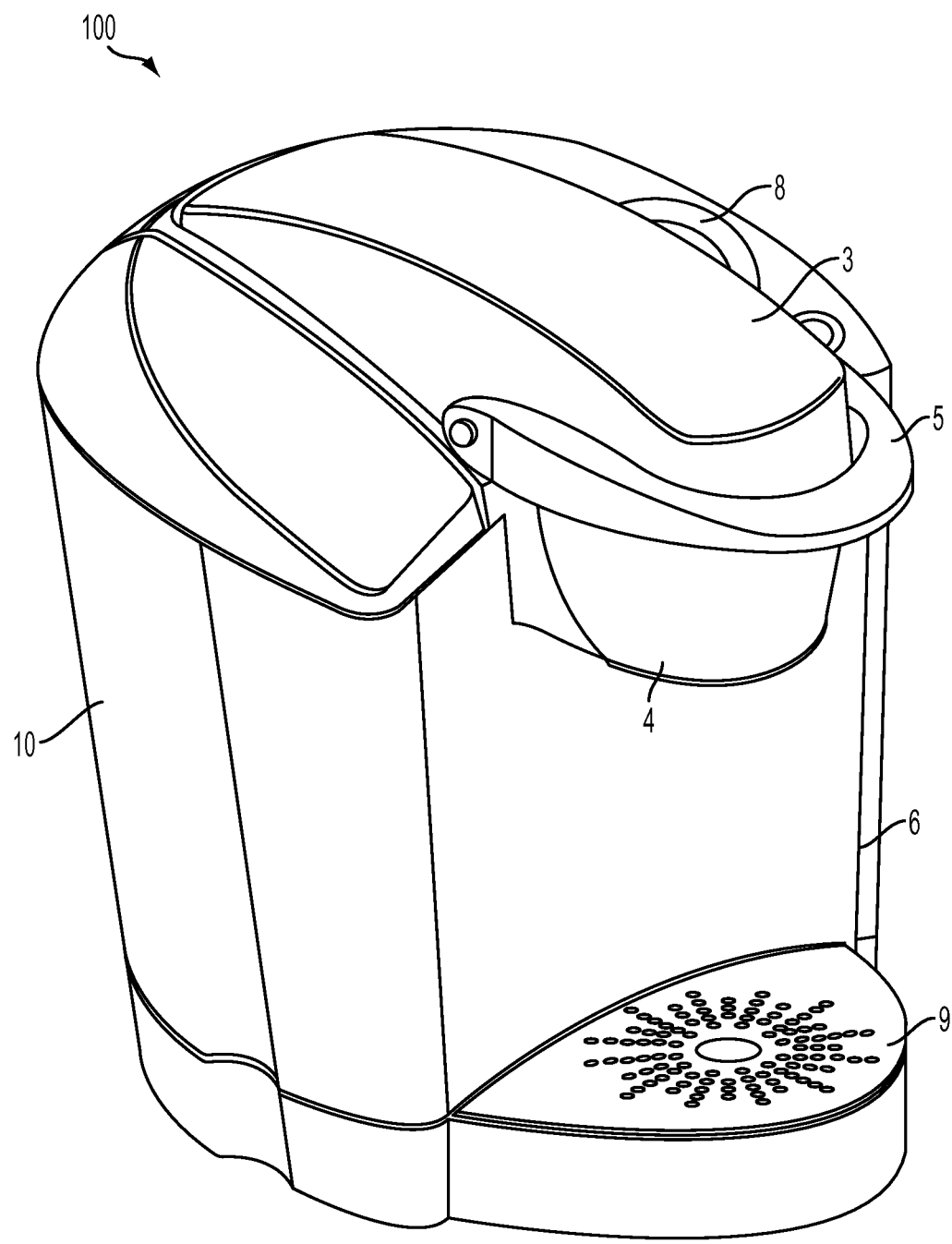
FIG. 46 shows a perspective view of a beverage forming apparatus for use in aspects of the invention.

Cartridges in accordance with aspects of the invention may be used with any suitable beverage machine. For example, FIG. 46 shows a perspective view of a beverage forming apparatus 100 that may be used to form any suitable beverage, such as tea, coffee, other infusion-type beverages, beverages formed from a liquid or powdered concentrate, hot or cold drinks, etc. In this illustrative embodiment, the apparatus 100 includes an outer frame or housing 6 with a user interface 8 that the user may operate to control various features of the apparatus 100. A beverage cartridge 10 may be provided to the apparatus 100 and used to form a beverage that is deposited into a cup or other suitable receptacle that is placed on a drip tray 9 or other support, if any. The cartridge 10 may be manually or automatically placed in a cartridge receiving portion defined by first and second portions 3 and 4 of the beverage forming apparatus 100. For example, by lifting a handle 5, the user may move the first and second portions 3 and 4 to an open position to expose a suitably shaped area in which the cartridge 10 may be placed. After placement of the cartridge 10, a handle 5 or other actuator may be moved in a manual or automatic fashion so as to move the first and second portions 3 and 4 to a closed position (shown in FIG. 46), thereby at least partially enclosing the cartridge 10 within a brew chamber. It should be understood, however, that the cartridge 10 may be received in any suitable way by the apparatus 100, as the way in which the apparatus 100 receives or otherwise uses the cartridge 10 is not critical to aspects of the invention.

Once the cartridge 10 is received, the beverage forming apparatus 100 may use the cartridge 10 to form a beverage. For example, one or more inlet needles 50 (see FIG. 3 or 4) associated with the first or second portion 3, 4 may pierce the cartridge 10 so as to inject heated water or other liquid into the cartridge 10. In one aspect of the invention, sonic excitation of the beverage medium, liquid or other component in the cartridge may be used together with pulsatile introduction of liquid into the cartridge. It has been found in some embodiments that pulsed flow of liquid into the cartridge together with sonic-induced movement can be very effective in helping dissolve beverage media, such as powdered materials. The pulsed flow may be arranged in any suitable way, such as one or more introductions of liquid into the cartridge per second at a volume of 1% or more of the total beverage for each intermittent liquid introduction (e.g., slugs of water having a volume of about 3-5 ml may be introduced once per second to form a 300 ml beverage.) In some embodiments, individual slugs of liquid may be introduced at a jet or other relatively high speed way, e.g., to help cause movement of the beverage medium. The first or second portion 3, 4 may also include one or more outlet needles or other elements 52 to puncture or pierce the cartridge 10 (as needed) at an outlet side to permit the formed beverage to exit the cartridge 10. If the inlet and outlet are provided at a same side of the cartridge 10, such as at the lid 38 shown in FIG. 3, the cartridge 10 may be oriented during beverage formation so that the lid 38 is below the bottom 16 (e.g., with the lid 38 facing generally downward) or is otherwise oriented so that beverage can be suitably removed from the cartridge 10.

Figure 47:
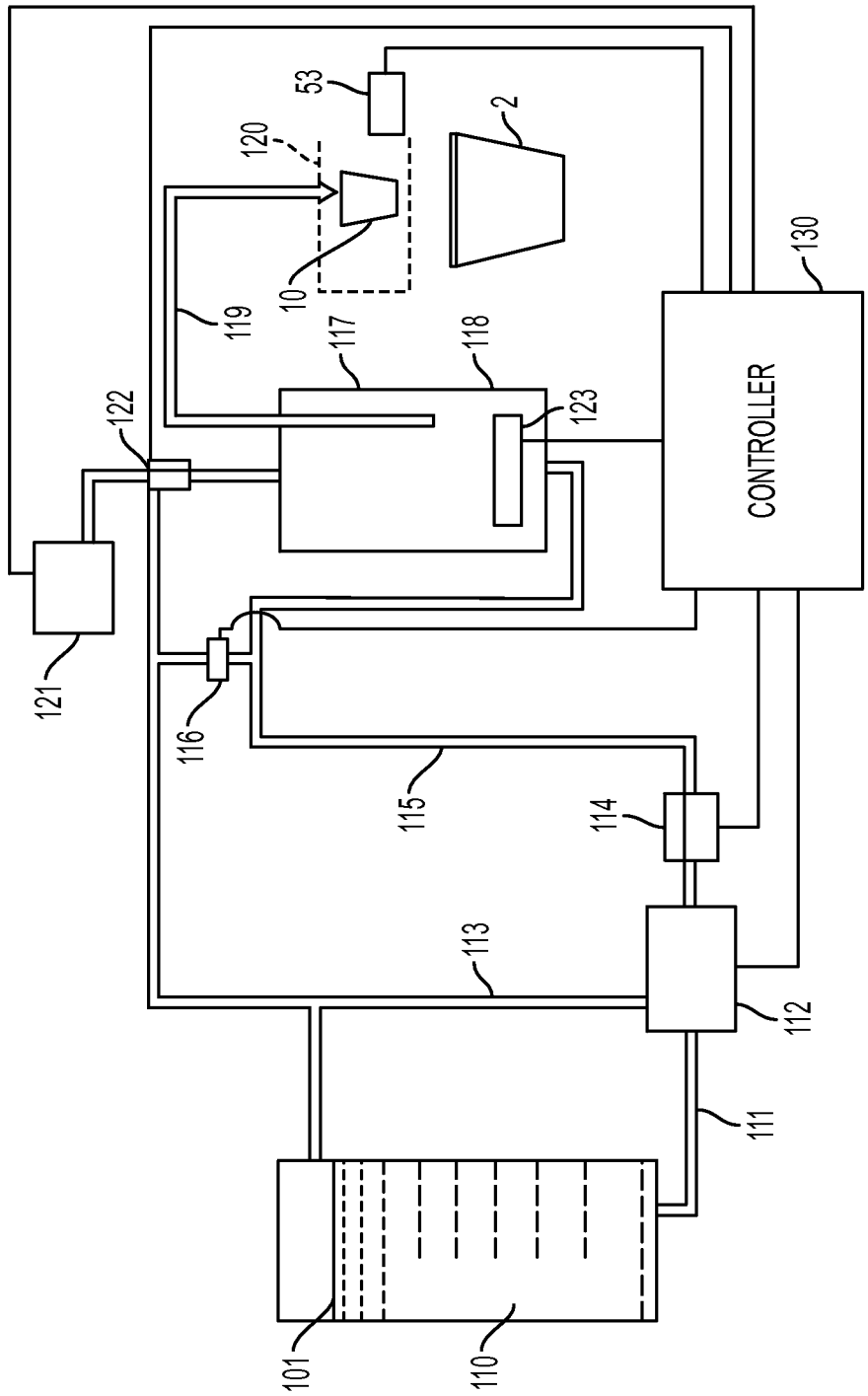
FIG. 47 is a schematic block diagram of components of a beverage forming apparatus usable in accordance with aspects of the invention.

FIG. 47 shows a schematic block diagram of various components included in a beverage forming apparatus 100 in one illustrative embodiment, such as that in FIG. 46. Those of skill in the art will appreciate that a beverage forming apparatus 100 may be configured in a variety of different ways, and thus aspects of the invention should not be narrowly interpreted as relating only to one type of beverage forming apparatus. Water or other liquid from a storage tank 110 may be provided via a supply conduit 111 to a pump 112 (such as a centrifugal pump, piston pump, solenoid pump, etc.), which pumps the liquid via a pump conduit 115 to a metering tank or chamber 118. Operation of the water pump 112 and other components of the apparatus 100 may be controlled by a controller 130, e.g., including a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions. The metering tank 118 may be filled with a desired amount of liquid by any suitable technique, such as running the pump 112 for a predetermined time, sensing a water level in the metering tank 118 using a conductive probe sensor or capacitive sensor, detecting a pressure rise in metering tank 118 when the liquid fills the tank, or using any other viable technique. For example, the controller 130 may detect that the metering tank 118 is completely filled when a pressure sensor detects a rise in pressure indicating that the water has reached the top of the metering tank 118. Water in the tank may be heated, if desired, by way of a heating element 123 whose operation is controlled by the controller 130 using input from a temperature sensor or other suitable input. Water in the metering tank 118 may be dispensed via a metering tank conduit 119 to a brew chamber 120 or other beverage forming station. The brew chamber 120 may include any beverage making ingredient, such as ground coffee, tea, a flavored drink mix, or other substance, e.g., contained in a cartridge 10. Liquid may be discharged from the metering tank 118 by pressurizing the metering tank with air provided by an air pump 121 that causes the liquid to be discharged out of a tube 117 and into the metering tank conduit 119. Completion of the dispensing from the metering tank 118 may be detected in any suitable way, such as by detecting a pressure drop in the metering tank 118, by detecting a water level change in the metering tank 118, use of a flow meter, or using any other viable techniques. Liquid may alternately be discharged from the metering tank 118 by the pump 112 operating to force additional liquid into the tank 118, thereby displacing water out of the tank 118 and to the brew chamber. A flow sensor or other suitable device may be used to determine the amount of liquid delivered to the tank 118, and thus the amount of liquid delivered to the brew chamber. Alternately, the pump 12 may be a piston-type or metering pump such that a known volume of liquid may be delivered from the pump 112 to the tank 118, thus causing the same known volume to be delivered to the brew chamber 120. Liquid may be introduced into the cartridge 10 at any suitable pressure, e.g., 1-2 psi or higher.

The beverage forming apparatus 100 may also include one or more sonic emitters 53 to interact with the cartridge 10 during beverage formation. The sonic emitter 53 may be moveable so as to move into contact with or otherwise suitable position relative to the cartridge 10 in the brew chamber 120, or may be stationary with the cartridge 10 moved into suitable position relative to the emitter 53. The sonic emitter 53 may include any suitable components, such as one or more piezoelectric elements that function as an ultrasonic transducer, an electromagnetic device (such as a speaker driver) that produces ultrasonic energy, a mechanical device that produces sonic energy (such as a motor driven rod or other component that is caused to vibrate at a suitable frequency of 10 Hz to 100 kHz or more), and so on. The sonic emitter 53 may also include one or more acoustic coupling components, such as a rubber gasket, water bath or other element that helps to couple acoustic or other vibrational energy to the cartridge 10. The controller 130 may also include a suitable control or driver circuit to cause the sonic emitter 53 to emit sonic energy. In one embodiment, the sonic emitter 53 can include an ultrasonic vibratory transducer such as a Model XL-2000 model with probe specifications of a CML-4 with a P-1 microprobe, manufactured and obtained from Qsonica, LLC. This ultrasonic transducer operates at frequencies of about 22 kHz.

The beverage forming apparatus (e.g., the controller 130) may include a RFID tag reader or other arrangement suitable to identify a cartridge or type of cartridge and control apparatus operations (such as operation of the sonic emitter 53, water temperature, water volume, etc.) based on the cartridge or type of cartridge. For example, cartridges may include an RFID tag, barcode, alphanumeric text, a color code, or other machine readable indicia that the controller 130 can read or otherwise identify. Based on the indicia (which may include a serial number, an alphanumeric text string, a name or type of beverage medium in the cartridge, a type of drink to be formed using the cartridge, etc.), the controller 130 may vary the apparatus operation to adjust the type of beverage produced. In some embodiments, the indicia may be used to determine whether, and to what extent, a sonic emitter or other drive system should be operated to introduce sonic energy to the cartridge. As mentioned above, some beverage types may require more or less (or no) sonic-energy induced movement for beverage formation, and the controller 130 may operate the sonic emitter 53 accordingly. In addition, or alternately, cartridges could be made to accommodate different sonic excitement of beverage media, etc., e.g., by providing differently sized, shaped or otherwise configured motion creating structure for different types of cartridges. Thus, in some embodiments, the sonic emitter 53 may always operate in the same way, but control of whether sonic-induced motion is provided to the cartridge interior may be made by the presence, absence or other characteristics of motion creating structure associated with the cartridges. For example, in embodiments where no vibratory motion is desired in a cartridge interior, no motion creating structure may be provided. In other embodiments where vibratory motion is desired, motion creating structure may be provided that couples with the sonic emitter to transmit sonic energy to the interior space. However, in both cases, the sonic emitter may be operated in the same way when using both types of cartridges.

Figure 48:
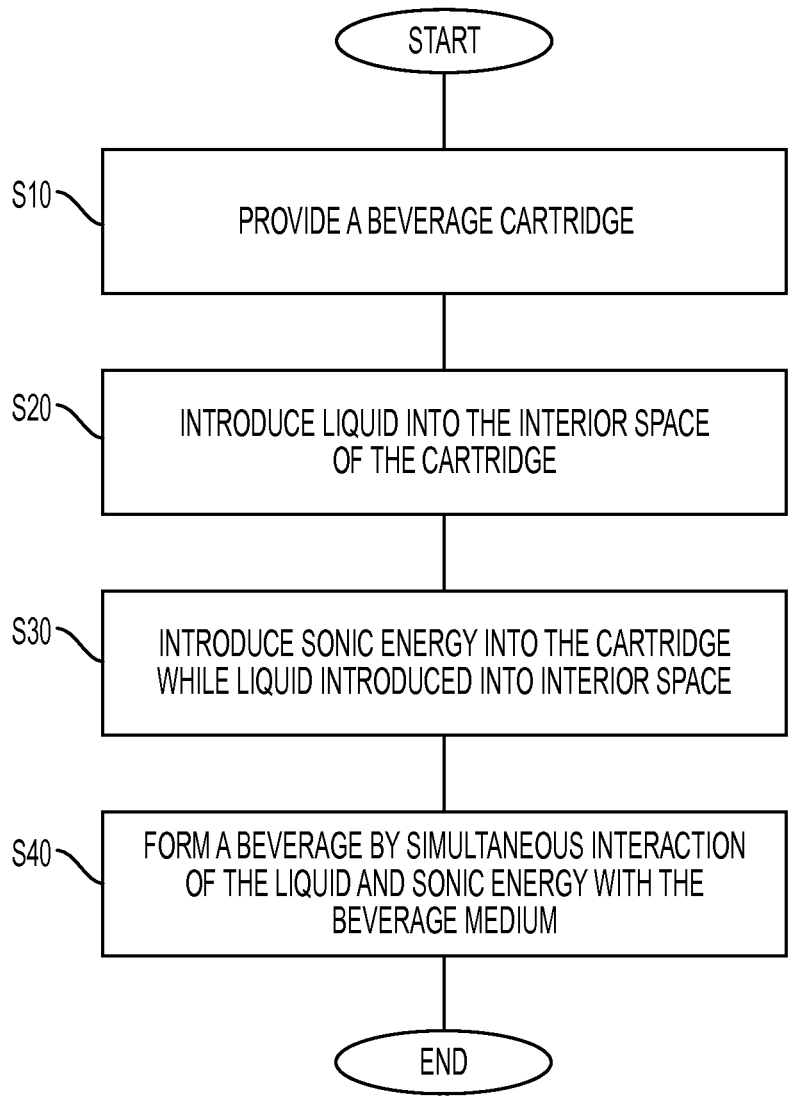
FIG. 48 shows steps in a method of preparing a beverage in accordance with aspects of the invention.

In other aspects of the invention, methods for forming a beverage using a cartridge and sonic energy are provided. Some embodiments in this regard may provide one or more of the following advantages: (1) increasing the speed of forming a beverage, (2) increasing the strength of a beverage, (3) producing different qualities of beverages, (4) increasing the degree of extraction of a beverage material during brewing, and/or (5) enabling the use of beverage media that would otherwise be unusable for a given application (e.g., allow the use of a fine powdered material that, in the absence of sonic-induced movement, would not be expected to fully dissolve into liquid introduced into a cartridge). In one embodiment shown in FIG. 48 a method for forming a beverage includes, in step S10, providing a beverage cartridge arranged for use in a beverage forming machine to make a beverage. The cartridge may include a container having a closed interior space and a beverage medium located in the interior space. As discussed above, the cartridge may take any of a variety of forms, e.g., may be permeable or impermeable, may have a sachet, pod, or other form, may include relatively rigid and/or flexible elements, may be arranged to maintain a specific shape or shapeless, may include a filter or not, if a filter is included, it may be located in the interior space of the cartridge and/or at the cartridge exterior (e.g., like that in many beverage pods), and so on.

In some embodiments, the cartridge may include a sonic receiver attached to or otherwise associated with the container and arranged to transmit vibratory or other sonic energy from a sonic emitter located outside of the closed interior space into the interior space for interaction with the beverage medium. For example, the cartridge may include an acoustically compliant portion that is arranged to vibrate in response to exposure to acoustic energy so that the acoustically compliant portion introduces sonic energy having a desired frequency and/or intensity into the interior space of the cartridge. The acoustically compliant portion may have a physical structure, material composition or arrangement, or other features that allow the acoustically compliant portion to operate as desired.

In other embodiments, a sonic receiver of the cartridge may include a notch, groove, recess, or other depression in a portion of the container, such as a sidewall, bottom, lid or other part of the cartridge. (It should be understood that a cartridge need not include a bottom, sidewall and/or lid. Some embodiments, such as a spherically shaped container, may not have any defined bottom or lid, for example.) The notch, groove, etc. may engage with a sonic emitter or other vibratory drive system so as to couple at least a portion of the cartridge with the drive system. In other embodiments, the sonic receiver may include a protrusion or other portion that is received by a sonic emitter, e.g., a portion of the container may be received into a hole, recess or other depression of the sonic emitter. The sonic receiver may be transparent, or substantially transparent to acoustic energy emitted by the sonic emitter, allowing the sonic emitter to introduce sonic energy directly into the cartridge. In other arrangements, the sonic receiver may transmit sonic energy into the interior space of the cartridge.

In step S20, liquid may be introduced into the closed interior space of the cartridge. Any suitable liquid may be introduced into the interior space, such as water, filtered, carbonated or otherwise processed water, milk, juice, coffee extract, etc. Introduction of the liquid may be done in any suitable way, such as by piercing the container, e.g., with a needle, and injecting liquid into the closed interior space. In other embodiments, pressurized liquid may be applied to the exterior of the cartridge container to cause one or more openings to form so as to admit the liquid. In other embodiments, the liquid may be simply poured into the cartridge, e.g., where a lid of the cartridge is removed to allow water to be poured into the cartridge. The liquid may be introduced under pressure, e.g., 1-2 psi or more, and may be introduced at any suitable flow rate and along with any other suitable materials, such as air bubbles entrained in the liquid, solid materials suspended in the liquid, etc.

In step S30, sonic energy may be introduced into the closed interior space of the cartridge while liquid introduced into the closed interior space is present in the cartridge. Sonic energy may be introduced in any of the ways described above, including inserting an ultrasonic emitter probe into the cartridge, positioning a sonic emitter in contact with or suitably near a sonic receiver of the cartridge, and so on. Sonic energy may be transmitted directly through the container, or may be introduced by an acoustically compliant portion of the cartridge that vibrates in response to exposure to sonic energy and by the vibration introduces sonic energy into the interior space. In some embodiments, a sonic emitter may cause movement of a motion creating structure in the cartridge to cause movement of the beverage medium in the closed interior space. For example, a vibratory drive system may move a part of the cartridge, which causes a motion creating structure to move within the interior space of the cartridge, thereby causing motion of the beverage medium, liquid in the interior space, a filter in the cartridge, etc.

In step S40, a beverage may be formed by simultaneous interaction of the liquid and sonic energy with the beverage medium. This step may include a variety of different features, such as causing materials to pass through a filter in the cartridge that would not pass through the filter in the absence of the sonic energy. For example, the beverage may be formed with a higher level of dissolved and/or suspended materials than would be present in the absence of the sonic energy. In other embodiments, the beverage may have a turbidity and/or a level of total dissolved solids that is higher than would be present in the absence of the sonic energy. In yet other embodiments, the step of forming a beverage may include causing flow of beverage medium and liquid in the interior space by exposing the interior space to the sonic energy. For example, while introducing liquid into the interior space typically will cause flow of beverage medium and liquid in the interior space, the sonic energy introduced into the cartridge may cause additional flow or other movement of beverage medium and liquid in the interior space. Such additional movement may help dissolve materials in the beverage medium and/or otherwise cause faster or more efficient extraction of materials from the beverage medium.

The inventors have performed experiments described below. These experiments are not intended to limit the scope of aspects of the invention, but rather provide support for some of the aspects of the invention described and claimed herein.

Example 1

18 K-Cup brand cartridges of a decaffeinated Arabica medium roast and ground coffee were obtained from standard product-for-sale by Green Mountain Coffee Roasters, Inc. (GMCR) under the trade name "Breakfast Blend Decaf." Nine of the cartridges were brewed at the 192 deg F. water temperature at the 8 ounce setting on a "Platinum" Single Cup Coffee Brewer which is also sold by GMCR. These nine brewed samples are the "control".

The next nine samples were also brewed on the Platinum brewer, but were subjected to externally-applied sonic energy. To apply the energy during brewing, the brewer was modified by removing the plastic housings surrounding the cartridge brew chamber, such that the sidewall of the cartridge was exposed. A "Sonicare Toothbrush" manufactured by Philips was obtained from standard product-for-sale at a retail store. The toothbrush was assembled with the brush head in place. During brewing, the back of the head of the brush (not the bristles) was pressed against the exposed wall of the cartridge and the power was switched "on". In this instance, there was no notch or other depression in the cartridge. The sonically-vibrating head was kept pressed against the cartridge during the entire brew cycle. The wall of the cartridge vibrated due to the action of the sonic vibrations of the brush head, as evidenced by simply touching and sensing the vibrations with a finger. The nine sonically-brewed samples are the "test".

Both the control and the test brewed coffee samples were analyzed for turbidity measurements in "NTU's". "NTU" units are Nephelometric Turbidity Units. These were measured using a HACH model 2100N Turbidimeter, available from Hach Company. The NTU values were measured on the coffee about 5 minutes after brewing the coffee.

The results of the NTU measurements are:
Control: 37.7, 32.8, 34.4, 39.4, 31.2, 33.8, 34.0, 47.0, 31.3
Test: 63.9, 62.1, 49.5, 46.9, 41.8, 59.8, 57.3, 66.7, 54.7
Control Mean: 35.7
Test Mean: 55.9

One skilled in coffee technology will recognize that the coffee became more turbid as sonic power was externally applied. One skilled in coffee technology would recognize that increased turbidity is an indicator of increased coffee strength, and can be caused by suspended solids, oils and other "colloidal" substances. Surprisingly, the application of sonic energy appears to have enhanced the ability of colloidal substances to pass through a coffee filter such as a paper coffee filter. The inventors can postulate that possibly the sonic energy modified the colloidal substances and/or agitated the beverage materials to release the colloidal material and pass them through the filter.

Example 2

6 K-Cup brand cartridges each including about 12 grams of dark roast and ground coffee were obtained from standard product-for-sale by Green Mountain Coffee Roasters, Inc. (GMCR) and were brewed at the 192 deg F. water temperature at the 8 ounce setting on a "B80" Coffee Brewer sold by Keurig, Incorporated. During brewing, a sonic emitter in the form of a "sonicator" Model XL-2000 model with probe specifications of a CML-4 with a P-1 microprobe, manufactured and obtained from Qsonica, LLC, was inserted through the lid of each cartridge and into the interior space about 0.25 inches. The total brew time for all power levels was about 35 seconds. The sonic energy was applied starting at about 5 seconds after the water flow was initiated and then stopped at the very end of the 35 second period. Each cartridge was brewed while the sonicator was provided with different power levels, i.e., 0, 5, 7, 11. 15 and 40 watts. Turbidity measurements (in "NTU" units) of the resulting coffee solutions were measured using a HACH model 2100N Turbidimeter, available from Hach Company about 5 minutes after brewing the coffee. "Total Dissolved Solids" (TDS) measurements were also made of the same brewed coffee samples. These measurements were also taken at about 5 minutes after brewing the coffee using a model Ultrameter II 6PII CE, available from Myron L Company. The results of the NTU and TDS measurements for the six cartridges were about:

NTU: 70, 140, 210, 290, 350, 410
TDS: 1.130, 1.110, 1.125, 1.112, 1.122, 1.190
Watts: 0, 5, 7, 11. 15, 40

One skilled in coffee technology will recognize that the coffee became more turbid as sonic power was increased. One skilled in coffee technology will also recognize that increased turbidity is an indicator of increased coffee strength, and can be caused by suspended solids, oils and other "colloidal" substances. Brewed coffee with sonic energy application was tasted relative to coffee in which no sonic power was applied, and was found to taste stronger when such sonic energy was applied. Surprisingly, the application of sonic energy appears to have enhanced the ability of colloidal substances to pass through a coffee filter such as a paper coffee filter. One skilled in coffee technology recognizes that paper-filtered coffee can suffer from weak taste due to the lack of such colloidal or turbidity-causing substances. The inventors can postulate that possibly the sonic energy modified the colloidal substances and/or agitated the beverage materials to release the colloidal material and pass them through the filter.

Regarding TDS, at the highest power setting between 40 and 45 watts, a dramatic increase in dissolved solids was achieved (1.190% dissolved solids) versus 1.130% dissolved solids when no power was applied. Surprisingly, lower levels of dissolved solids were achieved at power settings below 20 watts. A visual examination of the bed of coffee grounds after sonic brewing (by peeling the lid from the cartridge) showed that a channel or tunnel was formed through the bed, most likely caused by the sonic energy emanating from the tip of the probe. The inventors can postulate that the open channel or tunnel caused a portion of the water to more quickly pass through the bed of coffee and thus drop the overall extraction efficiency of dissolved solids. Yet, even though a drop in extraction efficiency of dissolved solids was observed, the extraction/suspension of turbidity-effecting substances was not, which is an entirely unanticipated result.

Example 3

A "Platinum" Single Cup Coffee Brewer sold by Keurig, Incorporated was used to brew beverages using several different types of beverage media. Each cartridge was arranged with a frustoconical cup container, a foil laminate lid and, for some beverage types, a filter attached near the top rim of the cartridge. The brewer was modified to move the cartridge receiver/brew chamber outside of the brewer for attachment to the cone of a loudspeaker (i.e., a voice coil actuator) by a simple linkage. The loudspeaker was driven by a signal generator via an amplifier, allowing the cartridge and receiver to be vibrated with a range of frequencies and amplitudes. With different configurations of the loudspeaker and linkage, the cartridge and receiver could be vibrated on a horizontal axis, a vertical axis, or in a rotary manner about the vertical axis.

The brewer is designed to provide a flow with an approximately constant pressure. For most beverage types, an 8 oz volume of water is delivered through the cartridge in roughly 35 seconds. In some experiments it was found that vibrating the cartridge could result in an increased resistance to flow in the cartridge, possibly due to the cartridge filter filling up with fine particles. This would result in the brewer delivering water at a reduced flow rate. In these cases, a peristaltic pump was applied to the tubing from the brewer to the inlet of the cartridge receiver to ensure a constant flow rate. As such, the results described in the following sections were achieved under essentially constant flow rate conditions.

A number of other conditions were controlled to ensure that the observed effects were due solely to the vibration:
  The temperature of the brewed beverage was measured as soon as it was delivered, to check for minimal variation.
  The brewer was filled using "soft water," prepared from distilled water by adding a fixed concentration of salts.
  The K-cups were hand-filled with a weighed amount of beverage medium, to ensure a constant fill weight.

Various measurements were made on the beverages produced:
  TDS (ppm KCl at 20 degrees C.) was measured using a COM-100 conductivity meter from HM Digital. The reading was corrected for the temperature of the delivered brew (also measured by the COM-100) to give equivalent TDS at 20° C.
  Turbidity was measured using 2100N Turbidimeter from Hach.
  Brix (refractive measurement of TDS) was measured using a DR-100 L refractometer from Bellingham & Stanley Ltd.

Coffee Testing

Cartridges containing Green Mountain Coffee Roasters, Inc. (GMCR) "Dark Magic" roasted coffee grounds were used. Five cartridges were run with no vibration, where the volume of beverage produced was about 8 ounces. The results are shown below:

| Fill weight (gm) | Brew time (s) | Turbidity | TDS | Brix |
|---|---|---|---|---|
| 14.69 | 33 | 24.7 | 1181 | 1.4 |
| 14.92 | 32 | 29.9 | 1192 | 1.5 |
| 14.77 | 33 | 37.3 | 1212 | 1.6 |
| 14.89 | 32 | 30.2 | 1222 | 1.5 |
| 14.8 | 32 | 33.4 | 1242 | 1.6 |

Another five cartridges were run with horizontal vibration at 20 Hz frequency at 3.5 mm amplitude, and the results are shown below:

| Fill weight (gm) | Brew time (s) | Turbidity | TDS | Brix |
|---|---|---|---|---|
| 14.54 | 33 | 46.1 | 1151 | 1.5 |
| 14.58 | 32 | 46.5 | 1157 | 1.3 |
| 14.77 | 33 | 46.8 | 1199 | 1.2 |
| 14.5 | 32 | 48.3 | 1183 | 1.2 |
| 14.64 | 32 | 44.7 | 1163 | 1.4 |

The vibration clearly increased the turbidity of the brewed coffee, with only a slight reduction in dissolved solids (as measured by TDS or Brix).

Cocoa Powder Testing

Cartridges containing cocoa powder were used. One difficulty in forming a beverage using cocoa powder in a beverage cartridge is achieving adequate dissolution of the powder, which can result in residual cocoa powder, either dry or partly dissolved, left in the cartridge at the end of brewing.

Fifteen total cartridges containing cocoa powder were used to form a beverage where the volume of beverage produced was about 8 ounces. Five of the cartridges were used without applying vibratory energy to the cartridges. Five other cartridges were used while applying vibratory energy at 20 Hz with an amplitude of 0.8 mm, and the remaining five cartridges were used while applying vibratory energy at 20 Hz with an amplitude of 3.5 mm. Two of the cartridges used without vibratory energy included a relatively large amount of residue, while the other three cartridges were generally residue free. Of the five cartridges used with vibration applied to them at the 0.8 mm amplitude, none showed any solid residues, and two show residual water with a slight taint of residual, dissolved cocoa. Of the five cartridges used with vibration applied to them at the 3.5 mm amplitude, none showed any solid residues, one showed residual water with some dissolved cocoa and one showed residual water with a slight taint of dissolved cocoa.

In another experiment, cartridges containing cocoa powder and two steel ball bearings (about 4 mm) were vibrated horizontally at a frequency of about 20 Hz and an amplitude of about 0.6 mm to produce an approximately 8 ounce beverage. Little or no cocoa powder was observed to remain in the cartridges after use.

Skimmed Milk Powder Testing

Natural milk powders are not typically used in cartridges: the powders tend to form lumps under the application of hot water and these lumps do not pass through the filter. As a result, synthetic creamers are often used instead. However, these can be difficult and time consuming to formulate so as to both provide a good taste and to pass through the filter.

Five cartridges containing natural milk powder were tested under each of four conditions: no vibration, 100 Hz vibration at low amplitude, 20 Hz vibration at low and high amplitude. The table below shows the mean brew time and mean mass of residue in the cartridge after leaving the cartridge to dry, the mean TDS (ppm KCl) of the delivered beverage and mean Brix of the delivered beverage. For each of these measurements, a two-tailed t-test was used to compare the results for the three vibration conditions to the "no vibration" condition. The "t-test" columns show a p-value, i.e., the probability of the vibration results and no-vibration results sharing the same mean. As can be seen, all of the three vibration conditions maintained the brew time, reduced the residual powder in the cartridge and increased the dissolved solids in the delivered brew. In particular, 20 Hz vibration at 3.5 mm amplitude resulted in virtually no residue in the cartridge and (as a result) the highest level of dissolved solids in the delivered brew.

| Vibration | n | Mean Brew Time (s) | t-test | Mean Dry residue (g) | t-test | TDS | t-test | Brix | t-test |
|---|---|---|---|---|---|---|---|---|---|
| None | 5 | 20.0 | — | 1.40 | — | 2.06 | — | 2.90 | — |
| 100 Hz, 0.077 mm amplitude | 5 | 19.6 | 0.663 | 0.76 | 0.048 | 2.38 | 0.034 | 3.36 | 0.144 |
| 20 Hz, 0.8 mm amplitude | 5 | 21.6 | 0.129 | 0.48 | 0.008 | 2.63 | 0.005 | 3.48 | 0.071 |
| 20 Hz, 3.5 mm amplitude | 5 | 19.8 | 0.814 | 0.07 | 0.003 | 2.93 | 0.001 | 4.02 | 0.007 |

Tea Testing

Cartridges containing tea for brewing over ice were also. Five cartridges were tested under each of five conditions: no vibration, 100 Hz vibration at low and high amplitude, 20 Hz vibration at low and high amplitude. The table below shows the mean fill weight, mean brew time and mean turbidity for each of the five conditions. For brew time and turbidity, a two-tailed t-test was used to compare the results for the four vibration conditions to the "no vibration" condition. The "t-test" columns show a p-value, i.e., the probability of the vibration results and no-vibration results sharing the same mean. As can be seen, none of the four vibration conditions significantly changed the brew time, but the last three (100 Hz, 0.077 mm amplitude; Hz, 0.8 mm amplitude; 20 Hz, 3.5 mm amplitude) resulted in significant increases in turbidity.

| Vibration | n | Mean Kcup Weight (g) | Mean Brew Time (s) | t-test | Mean Turbidity | t-test |
|---|---|---|---|---|---|---|
| None | 5 | 9.39 | 29.25 | — | 56.00 | — |
| 100 Hz, 0.016 mm amplitude | 5 | 9.35 | 28.4 | 0.614 | 60.9 | 0.467 |
| 100 Hz, 0.077 mm amplitude | 5 | 9.37 | 27.2 | 0.234 | 86.29 | 0.004 |
| 20 Hz, 0.8 mm amplitude | 5 | 9.29 | 26.6 | 0.094 | 71.47 | 0.054 |
| 20 Hz, 3.5 mm amplitude | 5 | 9.42 | 28 | 0.383 | 259.5 | 0.000 |

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A beverage cartridge arranged for use in a beverage forming machine to make a beverage, comprising:
    a container having an opening, a lid closing the opening, and a closed interior space;
    a beverage medium located in the interior space, the beverage medium being used to form a beverage by interaction of the beverage medium with a liquid introduced into the interior space; and
    a motion creating structure in the closed interior space of the container, wherein, with the lid not removed from the opening, the motion creating structure is arranged to cause movement of the beverage medium or liquid in the cartridge relative to the container in response to oscillatory movement of a drive system located outside of the closed interior space and separable from the beverage cartridge; and wherein
    the motion creating structure includes one or more of: a depression in the container; an indentation of the container; one or more mixing balls; an agitator; and a flexible beam.

2. The cartridge of claim 1, wherein the motion creating structure includes an agitator that includes a first portion located in the interior space and a second portion that extends outside of the interior space.

3. The cartridge of claim 2, wherein the second portion of the agitator is arranged to mechanically couple with the drive system to translate motion of the drive system to the first portion of the agitator.

4. The cartridge of claim 1, wherein the motion creating structure includes an agitator that is attached to the container and is in the interior space.

5. The cartridge of claim 4, wherein the agitator is attached to the container and extends away from the container and into the interior space.

6. The cartridge of claim 5, wherein the agitator includes one or more paddles, fingers, fins, tabs or blades.

7. The cartridge of claim 5, wherein the agitator includes one or more paddles formed as indentations of the container.

8. The cartridge of claim 7, wherein the indentations in the container are arranged to mechanically couple with the drive system.

9. The cartridge of claim 1, wherein the motion creating structure includes one or more mixing balls that are movable in the interior space independently of the container, and wherein the mixing balls are arranged to create movement of the beverage medium or liquid in the container in response to movement of a container by the drive system.

10. The cartridge of claim 1, wherein the motion creating structure includes one or more wall elements in the interior space arranged to cause net rotary movement of the beverage medium or liquid in response to oscillatory rotation of the container.

11. The cartridge of claim 10, wherein the wall elements are arranged so that wall elements are arranged around a periphery of the container in a zig-zag arrangement.

12. The cartridge of claim 1, wherein the motion creating structure is arranged to create vortices in a liquid in the interior space in response to motion of the drive system.

13. The cartridge of claim 1, the cartridge further comprising a filter in the container arranged to filter at least part of a beverage formed by interaction of the beverage medium with liquid.

14. The cartridge of claim 13, wherein the filter is attached to the lid.

15. The cartridge of claim 1, wherein the beverage medium includes a powdered material that would not fully dissolve into liquid introduced into the cartridge to form a beverage of a given volume in the absence of movement caused by the motion creating structure.

* * * * *